United States Patent
Ando et al.

(10) Patent No.: US 6,476,379 B2
(45) Date of Patent: Nov. 5, 2002

(54) OPTOELECTRONIC DEVICES AND MANUFACTURING METHOD THEREOF

(75) Inventors: Kazunori Ando, Komoro (JP); Shoichi Takahashi, Saku (JP); Hiroshi Naka, Komoro (JP)

(73) Assignee: Hitachi, Ltd., Tokyo (JP)

( * ) Notice: Subject to any disclaimer, the term of this patent is extended or adjusted under 35 U.S.C. 154(b) by 21 days.

(21) Appl. No.: 09/764,287

(22) Filed: Jan. 19, 2001

(65) Prior Publication Data

US 2001/0023920 A1 Sep. 27, 2001

(30) Foreign Application Priority Data

Jan. 19, 2000 (JP) .................................... 2000-010503

(51) Int. Cl.[7] ................................................. G02B 6/36
(52) U.S. Cl. .................. 250/227.11; 250/239; 250/551; 385/88; 385/92
(58) Field of Search ................................. 250/239, 221, 250/222.1, 216, 551, 552, 227.11; 385/88, 92, 93, 94, 137

(56) References Cited

U.S. PATENT DOCUMENTS 6,371,664 B2 * 4/2002 Takahashi et al. ............ 385/88

* cited by examiner

*Primary Examiner*—Kevin Pyo
(74) *Attorney, Agent, or Firm*—Antonelli, Terry, Stout & Kraus, LLP

(57) ABSTRACT

It is a subject to realize an optoelectronic device for reliably monitoring a laser optical beam intensity by a photodetector. In the optoelectric device, a semiconductor laser chip, an optical fiber for taking a front laser beam of the semiconductor laser chip from the top end surface and a photodetector for receiving a rear laser beam of the semiconductor laser chip are fixed on a main surface of a platform, and each of the optical parts and portions including. an optical channels between each of the optical parts are covered with a silicone gel, wherein a portion of the main surface of the platform between the top end of the optical fiber and the semiconductor laser chip and between the photodetector and the semiconductor laser chip has concaves so that voids are not formed upon curing of the silicone gel. The edge of the concave on the side of the semiconductor laser chip is situated closer to the semiconductor laser chip than to the emitting facet of the semiconductor laser chip. The end of the bonding portion for fixing the semiconductor laser chip to the platform recedes inward of the emitting facet.

20 Claims, 14 Drawing Sheets

AT SILICON GEL CURING

OPTOELECTRONIC DEVICES AND MANUFACTURING METHOD THEREOF

BACKGROUND OF THE INVENTION

This invention relates to an optoelectronic device (semiconductor optical module) and a manufacturing method thereof and, more in particular, it relates to a technique effective for applying a technique of mounting a semiconductor laser chip, a photodetector and an optical fiber on a main surface of a platform referred to as a silicon platform and covering such optical parts with a guard layer r such as ma de of transparent silicone gel.

An optoelectronic device incorporated with a semiconductor laser (semiconductor laser chip) has been used as a light emitting source for an information processing device or as a light emitting source e for optical communication.

"Paper s C-3-33 of the IEICE collection for 1999 Electronic Society Conference of the Institute of Electronics Information and Communication Engineers of Japan" published from the Institute of Electronics Information and Communication Engineers of Japan discloses a surface mount type LD module according to Bellcore standards adopting a passive alignment system. In the surface mount type LD module, optical fibers are fixed with UV epoxy adhesives, and an optical device and an optical coupling portion are potted with an Si series resins. Also, the literature describes data for change of optical power in a temperature cycle test for −40 to 80° C.

Further, a passive alignment mount using the silicon platform is described in "Papers SC-2-77 of the IEICE collection for 1996 General Conference of the Institute of Electronics Information and Communication Engineers of Japan" published from the Institute of Electronics Information and Communication Engineers of Japan. The latter literature describes fixing of the LD module.

SUMMARY OF THE INVENTION

In the manufacture of conventional optoelectronic devices (semiconductor optical module) using silicon platforms (platforms), the top end of an optical fiber fitted along a groove of a silicon platform is adjusted for optical coupling with a semiconductor laser chip fixed to the surface of the silicon platform and then an optical fiber fitted to the silicon platform is fixed with a thermosetting resin (thermosetting epoxy resin) or an adhesive such as UV-ray setting adhesive.

The present applicant has made a study on the technique of fixing the optical fiber to a silicon platform in a short period of time and a technique of suppressing the change of optical power.

The present applicant has already proposed a technique of fixing the optical fiber to a silicon platform in a short period of time (Japanese patent application No. Hei 9-78602 filed on May 28, 1997) (Japanese Patent Laid-Open (Kokai) No. Hei 10-268168). In this technique, the existent method of preparing a silicon platform (platform) having a groove on the surface, then fixing an optoelectronic transducer (semiconductor laser chip) on the surface of the silicon platform at one end of the groove and fitting an optical fiber along the groove and, subsequently, controlling the light transmitting/receiving state between the optoelectronic transducer and optical fiber and fixing the optical fiber to the platform by means of a thermosetting resin is modified such that the optical fiber is provisionally fixed in a state being urged to the platform by a fixing means having shorter fixing time than the curing time of the thermosetting resin and then pressure is removed and the optical fiber is finally fixed by the thermosetting resin.

As an example, after coating a UV-ray setting adhesive to the optical fiber and the platform portion, the UV-ray setting adhesive is set by the irradiation of UV-rays thereby provisionally fixing the optical fiber to the platform and, subsequently, a portion of the optical fiber with the distance from the semiconductor laser chip remote from the provisional fixing position is covered with a thermosetting resin.

In this technique, since the provisional fixing has been completed by the UV-ray setting adhesive, after thermosetting resin is applied, the platform can be moved even before curing of the thermosetting resin, so that the platform can be removed from the fiber fixing machine in a short period of time and curing treatment (main fixing) of the thermosetting resin can be conducted by a batch processing. The batch processing can shorten the fixing time of the optical fiber per platform. Further, the optical coupling has high reliability.

On the other hand, the present applicant has adopted the technique and also made a study on the technique of reducing the package cost. Then, to reduce the package cost, the package main body (casing) and a lid (cap) constituting the package are made of plastic material and a structure of bonding the casing and the cap with a resin was adopted. Further, since the plastic material has less moisture proofness compared with ceramic material, it is intended to improve the moisture proofness by sealing a transparent silicone gel in the casing thereby covering the surface for each of parts including a semiconductor laser chip on a platform with the silicone gel.

However, it has been found by the present applicant that the fixing strength of the optical fiber is lowered and the reliability for fixing is lowered and the moisture proofness is lowered in the silicone gel sealing structure. It has been found that this is attributable to voids formed in the silicone gel.

Further, as a result of experiment and study on the mechanism of forming voids, it has been found that initially formed voids are increased in the subsequent temperature cycle, that is, depending on the temperature of the working circumstances.

Then, the present applicant has already proposed a technique of manufacturing an optoelectronic device having high fixing strength and high fixing reliability of optical fibers (Japanese Patent Application No. Hei 10-270339 filed on Sep. 24, 1998) (Japanese Patent Laidopen (Kokai) No. 2000-137147).

The followings are disclosed in the proposal described above (Japanese Patent Application No. Hei 10-270339) which concerns the problem of voids formed in the silicone gel.

FIG. 8 is a view schematically illustrating a portion in which an optical fiber 3 is fixed in a groove 2 of a silicon platform (platform) 1 by primary fixing (provisional fixing) with a UV-ray setting adhesive 4 and by secondary fixing (main fixing) with a thermosetting resin 5 and the upper surface of the silicon platform 1 is covered with a silicone gel 6. The optical fiber 3 comprises a clad 3b and a core 3a situating at the center thereof. A semiconductor laser chip 7 is shown by a dotted chain. Voids 10 tend to be formed, as shown in FIG. 8, in a silicone gel in a surrounded region 9 formed with a groove surface forming the groove 2 of the silicone platform 1 and the optical fiber.

Presence of the voids lowers the fixing strength of the optical fiber 3 to the silicon platform 1 and lowers the reliability of the fixing.

Further, the presence of the voids 10 per se lowers the moisture proofness and, when water intrudes, it is trapped around the void as the seed, so that water is less released to the outside to deteriorate the moisture proofness. Since the semiconductor laser chip 7 and the photodetector are disposed on the extended top of the optical fiber, and a wiring layer or wire is present at the periphery, trapping of water to the voids 10 may possibly cause oxidation or corrosion in each of the portions and lowers the moisture proofness of the optical module.

Further, in a state where water is trapped to the voids, water is frozen in a case where the optical module is exposed to the temperature lower than the freezing point and there may be also a worry of trouble caused by the volumic change.

In the experiment, as shown in FIGS. 9(a),9(b) and FIGS. 10(a),10(b), a metal frame 16 is placed at the bottom of a vessel 15, on which two glass capillaries 17 (0.13 mm inner diameter) are arranged in parallel and in contact with each other, and silicone gel 6 is filled in the vessel 15 such that the silicone gel 6 covers throughout the surface and the inside of both of the capillaries 17 so as not to involve voids. Subsequently, the vessel 15 was placed under the cure bake condition (baking temperature at 120° C., baking time for 60 min).

FIGS. 9(a),9(b) is a schematic view illustrating the state of distribution of voids 10 in a state where the silicone gel is cured under the cure bake condition in which FIG. 9(a) is a plan view and FIG. 9(b) is a cross sectional view.

Further, after curing of the silicone gel, an environmental test such as for temperature cycle was conducted. The environmental test such as for temperature cycle conducts (1) 40 cycles of temperature change for −40 to +85° C. as one cycle in about 35 min, (2) 136 hours of exposure to high temperature high humidity (85° C., relative humidity 85%), (3) 30 min of high temperature baking (120° C.) and (4) 1.5 hours of leaving at low temperature (55° C.), successively in this order.

FIGS. 10(a),10(b) is a schematic view illustrating the distribution of voids 10 formed in the silicone gel by the environmental test such as for temperature cycle in which FIG. 10(a) is a plan view and FIG. 10(b) is a cross sectional view.

Voids 10 in FIGS. 9(a),9(b) and FIG. 10(a),10(b) are depicted based on photograph and their positions are exact even when the shape is somewhat different from the actual state.

As shown in FIGS. 9(a),9(b), the voids 10 are scattered in the inner diametrical portion of the capillaries 17 but are not present on both ends thereof. It is considered that the silicone gel can be freely moved in the inner diametrical for the inside and the outside of the capillaries 17 in the inner diametrical portion on both ends of the capillaries 17 (open space), while movement of the silicone gel for compensating the shrinking decrease of the volume is insufficient at the inner diametrical portion inside the capillary 17, so that gaps, namely voids 10 are formed.

Further, as shown in FIGS. 10(a),10(b), since the they are exposed repeatedly to varying temperature and humidity in the environmental test, spaces are newly formed along with movement of the silicone gel to increase the voids 10 and, in addition, the shape of the voids 10 deforms by joining or separation of the neighboring gaps to each other. The voids increase in the size and are greatly displaced positionally at a high temperature of 120° C., whereas a number of small voids are formed at a low temperature of −55° C.

As shown in FIGS. 10(a),10(b), it can be seen that voids are newly formed also in a region where the voids 10 were not present in FIGS. 9(a),9(b), that-is, in a region surrounded with the metal frame 16 and the two capillaries 17 (surrounded region 9).

On the other hand, when a silicone gel is sealed in the plastic casing to cover the surface of each of parts including a semiconductor laser chip 7 on a silicon platform 1, as shown in FIG. 11, it has been found that voids 10 are formed not only in a silicone gel 6 filled in a groove 2 below an optical fiber 3 but also, as shown in FIG. 12 and FIG. 13, voids 10 are formed between the top end of the optical fiber 3 and the semiconductor laser chip 7.

It is considered that since the gap between the top end of the optical fiber 3 and the front facet of the semiconductor laser chip 7 is as narrow as 40 to 50 μm or less, the portion does not act as an open space but the voids are liable to be formed, particularly, in a case of undergoing heating repetitively. That is, in an initial state where the silicone gel is filled after fixing and curing processing has been applied for the silicone gel 6, formation of the void 10 is not observed between the top end of the optical fiber 3 and the front facet of the semiconductor laser chip 7. However, after the heat cycle test, it sometimes occurs that voids 10 are formed between the top end of the optical fiber 3 and the front facet of the semiconductor laser chip 7.

In a state where the void 10 is formed between the top end of the optical fiber 3 and the semiconductor laser chip 7 and the void 10 interferes an optical channel of a laser beam 11 emitted from the semiconductor laser chip 7 (refer to FIG. 12, FIG. 13), since the void 10 acts as a lens, the direction of the laser beam 11 emitted from the semiconductor laser chip 7 is changed (deviated to cause shading) to sometimes inhibit optical coupling with the optical fiber 3 or lower the optical coupling efficiency. The optical coupling is often inhibited when the optical fiber 3 is a fine single mode fiber with the core diameter 3a of about 10 μm diameter. In FIG. 11 through FIG. 13, a photodetector 19 receives a laser beam 11 emitted from the rear facet of the semiconductor laser chip 7. Further, in FIG. 13, the silicone gel 6 is sometimes present over the entire upper surface of the platform 1.

By the way, as a result of analyzing and studying a monitor current Is of the photodetector 19 for receiving (monitoring) a laser beam 11 emitted from the rear facet of the semiconductor laser chip 7, it has been found that Is tracking characteristic shows characteristic with hysteresis in some products as shown in FIG. 14. In the graph, the temperature is expressed on the horizontal axis and the relative value (ΔPf) for the output is taken on the vertical axis. ΔPf is a value obtained by subtracting a Pf value at 25° C. from a Pf value at t° C. and dividing the subtracted value by the Pf value at 25° C.

As shown in the graph, ΔPf is determined by (1) lowering the temperature from 25° C. to −40° C. successively, (2) elevating the temperature from −40° C. to 85° C. successively and then (3) lowering the temperature from 85° C. to −40° C. successively. While the ΔPf value is to be substantially identical both in the cases of (1), (2) and (3), it has been found that ΔPf draws a hysteresis loop of abruptly increasing in (2) after (1) and then returning to a lower value at about 50° C. in some products.

As a result of analysis and study in this regard, the present inventors have found that voids 10 are present between the rear facet of the semiconductor laser chip 7 and the light receiving facet of the photodetector 19 and ΔPf fluctuates by the presence of the void 10 and, depending on the case, Is tracking characteristic forms hysteresis.

FIG. 15 is a schematic view showing a semiconductor laser chip (LD) 7, a photodetector (PD) 19 and an optical fiber 3 fixed on the main surface of the platform 1, and a silicone gel 6 covering the main surface of the platform 1. As shown in the figure, a void 10 is formed on the rear facet of the semiconductor laser chip 7. In a state where the void 10 interferes the optical channel of a laser abeam 11 emitted from the rear facet of the semiconductor laser chip 7, since the void 10 acts as a lens, the direction of the laser beam 11 emitted from the semiconductor laser chip 7 is changed (deviated to cause shading), to fluctuate the monitor current Is.

As shown in FIG. 15, the present applicant adopts a structure for the semiconductor laser chip 7 that the end of the bonding layer 41 for fixing the semiconductor laser chip 7 on the platform 1 recedes inward of the facet 43 for emitting the laser beam. This structure is adapted to prevent the end of the bonding layer 41 from protruding into the optical channel to lower the amount of light to be transmitted or inhibit the transmission at all by shielding when the end of the bonding layer 41 is raised exceeding the facet 43.

The bonding layers 41, 42 are formed by metallizing a solder on the main surface of the platform 1. Then, after stacking the semiconductor laser chip 7 and the photodetector 19 such that their respective lower electrodes 45, 46 are overlapped on the bonding layers 41, 42, the bonding layers 41, 42 are melted by heating to fix the semiconductor laser chip 7 and the photodetector 19. The length of the lower electrodes 45, 46 are slightly longer than the length for the semiconductor laser chip 7 or the photodetector 19, so as to reliably fix the lower electrodes 45, 46 to the platform 1. Accordingly, the ends of the lower electrodes 45, 46 may further recede sometimes further inward of the ends of the bonding layers 41 and 42.

The receding length of the lower electrodes 45, 46 from the emitting facet 43 or receiving facet 44 is not limited particularly but it is defined as, for example, from 10 to 40 $\mu$m in view of variation in the length of the semiconductor laser chip 7 due to the scattering for the cleaving position upon forming the semiconductor laser chip 7.

Further, the distance from the main surface of the platform 1 to the surface of the semiconductor laser chip 7 displaced from the lower electrode 45 is not particularly limited and it is determined, for example, as 4 to 7 $\mu$m in view of the structure that the stripe portion (light emission portion) slightly protrudes.

Then, in the surrounded region 9 formed by the receding of the lower electrode 45 and the bonding layer 41, the void 10 may occasionally be formed in that the silicone gel can not move freely upon contracting in curing of the silicone gel 6.

In FIG. 15, the state of forming the void 10 is illustrated on the rear facet of the semiconductor laser chip 7 but the void 10 may possibly be formed also on the light receiving facet of the photodetector 19.

On the emitting facet of the semiconductor laser chip 7 opposed to the end face of the optical fiber 3, since the main surface of the platform 1 is deeply recessed, formation of the void 10 can be suppressed.

The void 10 may be possibly moved in the temperature cycle test to protrude into an optical channel between the semiconductor laser chip 7 and the photodetector 19 to fluctuate the monitor current Is of the photodetector 19.

In view of the above, the present inventor has studied a structure of a platform causing less voids between the semiconductor laser chip 7 and the photodetector 19 and, as a result, has accomplished this invention.

This invention intends to provide an optoelectronic device capable of stably monitoring the. optical power not hindering transmission (passage) of a laser beam from the semiconductor laser chip to the photodetector, as well as a manufacturing method thereof.

Further, this invention intends to provide an optoelectronic device capable of stably outputting optical power and stably monitoring the optical power, as well as a manufacturing method thereof.

The outline for typical aspects of the invention disclosed in this application is to be explained simply as below.

(1) The invention provides an optoelectronic device in which a semiconductor laser chip (light emitting part), an optical fiber (light receiving part) for taking at the front end a front laser beam emitted from the front facet of the semiconductor laser chip, and a photodetector (light receiving part) for receiving a rear laser beam emitted from the rear facet of the semiconductor laser chip are fixed on a main surface of a platform (silicon platform), and each of the optical parts and portions including the optical channels between each of the optical parts are covered with silicone gel, wherein the main surface portion of the platform between the top end of the optical fiber and the semiconductor laser chip and between the photodetector and the semiconductor laser chip has concaves so that voids are not formed upon curing of the silicone gel. The edge of the concave between the semiconductor laser chip and the optical fiber, on the side of the semiconductor laser chip (light emitting part), is situated closer to the semiconductor laser chip than to the end face (front facet) of the semiconductor laser chip, and the edge of the concave between the semiconductor laser chip (light emitting part) and the photodetector element (light receiving part), on the side of the semiconductor laser chip, is situated closer to the semiconductor laser chip than to the end face (rear facet) of the semiconductor laser chip.

Further, the ends of the bonding portion for fixing the semiconductor laser chip and the photodetector to the platform recede inward of the emitting facet and the light receiving facet respectively so as not to cause disadvantage in the transmission of light due to the protrusion of the end of the bonding layer. Further, the length of the edge for the concave extending in the direction perpendicular to the optical channel in-the concave between the light emitting part and the photodetector is made smaller than the width of the light emitting part opposed thereto.

The optoelectronic device as described above is manufactured by the following method.

A method of manufacturing an optoelectronic device having a casing, a cap covering the casing, a platform attached in the casing, a light emitting part fixed to the main surface of the platform and for emitting an optical beam from the end face, a light receiving parts fixed on the main surface of the platform and for receiving the optical beam emitted from the light emitting part, and a guard layer made of a transparent resin, filled within the casing and for covering the light emitting part, the light receiving parts and optical channels between the light emitting part and the light receiving parts, in which concaves are present in the main surface of the platform between the light emitting part and the light receiving part, and an edge of each of the concaves on the side of the. light emitting part is present closer to the light emitting part than to the end face of the light emitting part, wherein the method includes:

a step of mounting the light emitting part and the light receiving part on the platform;

a step of attaching the platform to the casing;

a step of connecting between the light emitting part and the light receiving parts, and between predetermined portions of the platform with conductive wires;

a step of filling the transparent resin in the casing;

a step of leaving the entire case in an atmosphere at a predetermined vacuum degree for a predetermined period of time to defoam voids in the transparent resin;

a step of leaving the case entirely in an atmosphere at a predetermined heating temperature for a predetermined period of time thereby curing the transparent resin to form a guard layer made of the transparent resin; and a step of attaching the cap to the casing.

The end of the bonding layer for fixing the light emitting part to the platform is fixed so as to recede inward of a light emitting facet of the light emitting part, and the end of the bonding layer for fixing the light receiving part to the platform is fixed so as to recede inward of a light receiving facet of the light receiving part.

The semiconductor laser chip as the light emitting part is fixed on the platform, a photodetector as the light receiving part is fixed on the platform so as to receive an optical beam emitted from the rear facet of the semiconductor laser chip, an optical fiber as the light receiving part is fixed on the platform for taking a optical beam emitted from the front facet of the semiconductor laser chip, the case as the casing is made of a plastic material with a guide for guiding the optical fiber, the transparent resin is filled in the casing so as to cover the platform, the semiconductor laser chip, the photodetector and the top end of the optical fiber, the vacuum defoaming treatment is conducted, then the thermosetting treatment to the transparent resin is conducted to form a transparent guard layer and the cap made of the plastic material is attached to the casing so as to cover the opening of the casing.

Any one of resin selected from silicone gel, silicone rubber, low stress epoxy resin, acrylic resin and urethane resin is filled in the casing as the transparent resin for forming the guard layer.

According to the means (1) above, (a) a concave is formed on the main surface portion of the platform between the semiconductor laser chip and the photodetector to form an open space, the edge of the concave on the side of the semiconductor laser chip is situated closer to the semiconductor laser chip than to the end face (rear facet) of the semiconductor laser chip, so that voids in the silicone gel formed in the fixed portion of the semiconductor laser chip in-adjacent with the open space are more effectively defoamed and no more result in troubles in transmitting and receiving of the laser beam between the semiconductor laser chip and the photodetector. Accordingly, the monitor current Is of the photodetector less fluctuates and stable laser beam intensity monitoring can be attained.

(b) A concave is formed also in the portion of the main surface of the platform between the semiconductor laser chip and the top end of the optical fiber to form an open space, the edge of the concave on the side of the semiconductor laser chip is situated closer to the semiconductor laser chip than to the end face (front facet) of the semiconductor laser chip, so that voids in the silicone gel formed in the fixed portion of the semiconductor laser chip near the open space are more effectively defoamed and cause no trouble in the transmitting and receiving of the laser beam between the optical fiber and the semiconductor laser chip. Further, since also the top end of the optical fiber forms an open space by the concave, voids are not situated in the optical channel at the top end of the optical fiber. Accordingly, the laser beam emitted from the emitting facet of the semiconductor laser chip can be received efficiently to the optical fiber and stable optical communication is possible.

These and other objects and many of the attendant advantages of the invention will be readily appreciated as the same becomes better understood by reference to the following detailed description when considered in connection with the accompanying drawings.

DETAILED DESCRIPTION OF THE PREFERRED EMBODIMENTS

Figure 1:
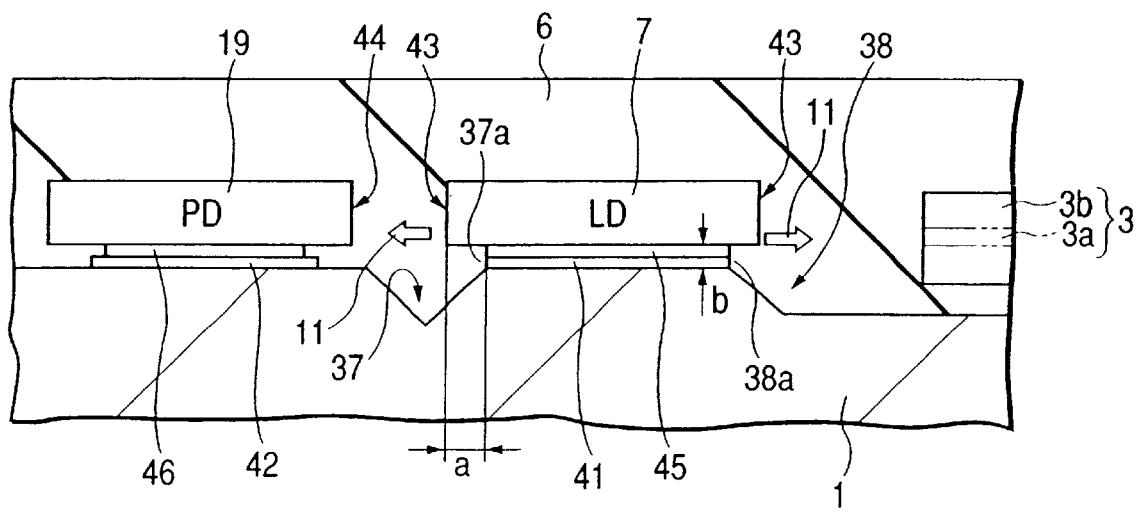
FIG. 1 is an enlarged cross sectional view illustrating a silicon platform portion in an optoelectronic device as a preferred embodiment (Embodiment 1) according to this invention.

This invention is to be described in details for preferred embodiments with reference to the drawings. Throughout the drawings for explaining the preferred embodiments of the invention, those having identical functions carry the same reference numerals, for which duplicate explanations are to be omitted.

Embodiment 1

Figure 2:
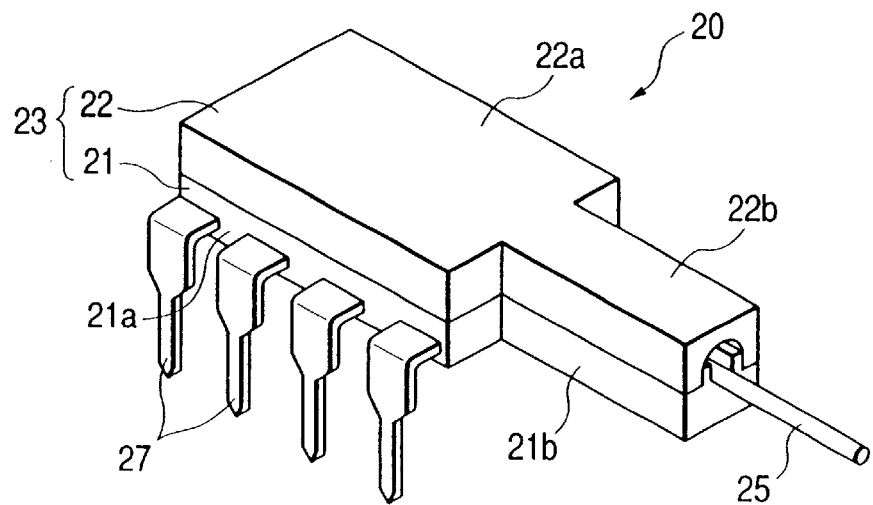
FIG. 2 is a perspective view illustrating an appearance of the optoelectronic device of Embodiment 1.
Figure 3:
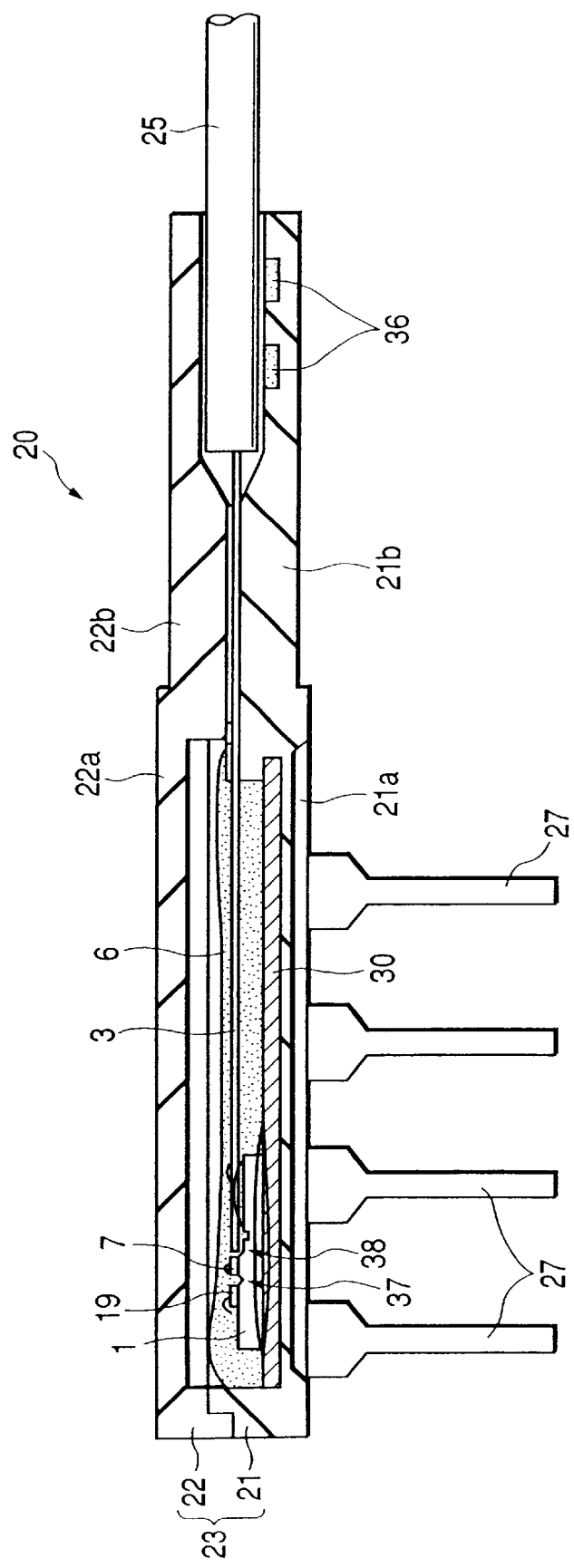
FIG. 3 is an enlarged cross sectional view along an optical fiber extending direction of an optoelectronic device of Embodiment 1.
Figure 4:
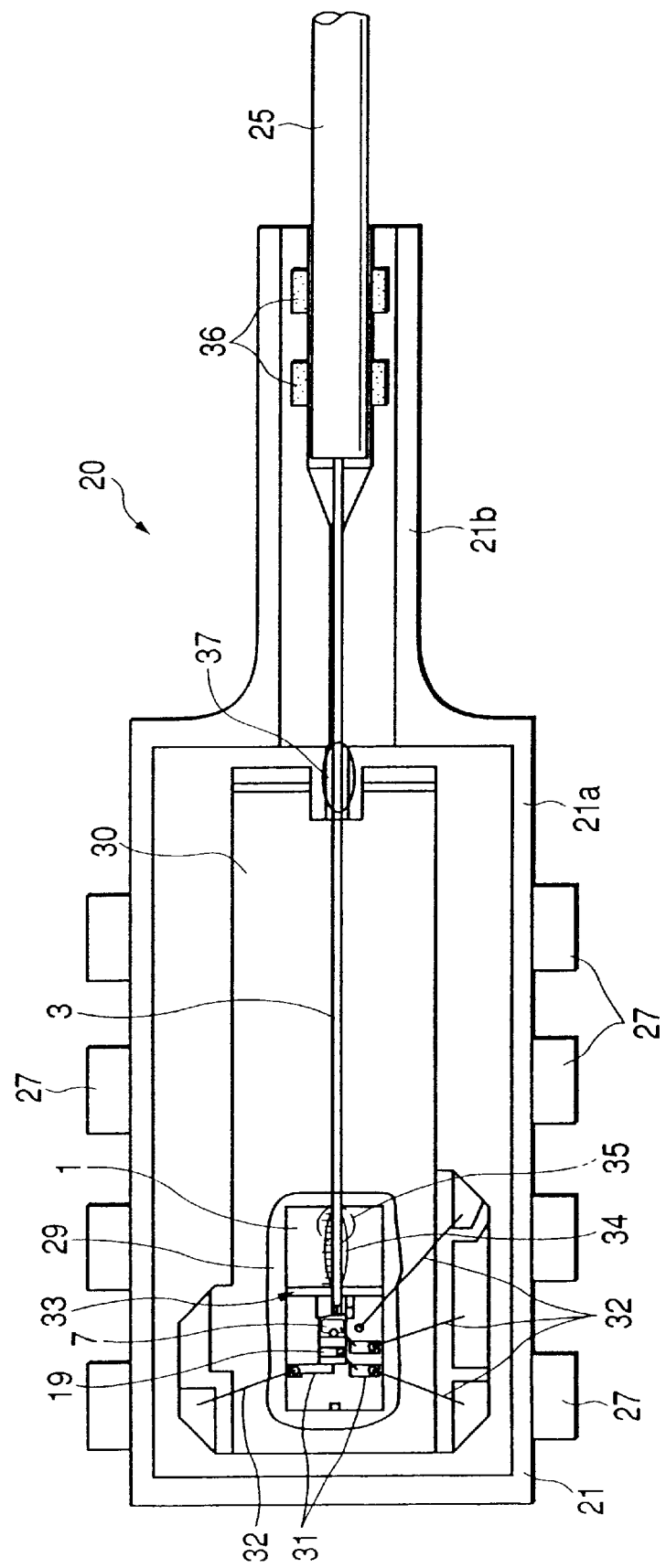
FIG. 4 is an enlarged plan view, with a cap being removed, of an optoelectronic device of Embodiment 1.
Figure 5:
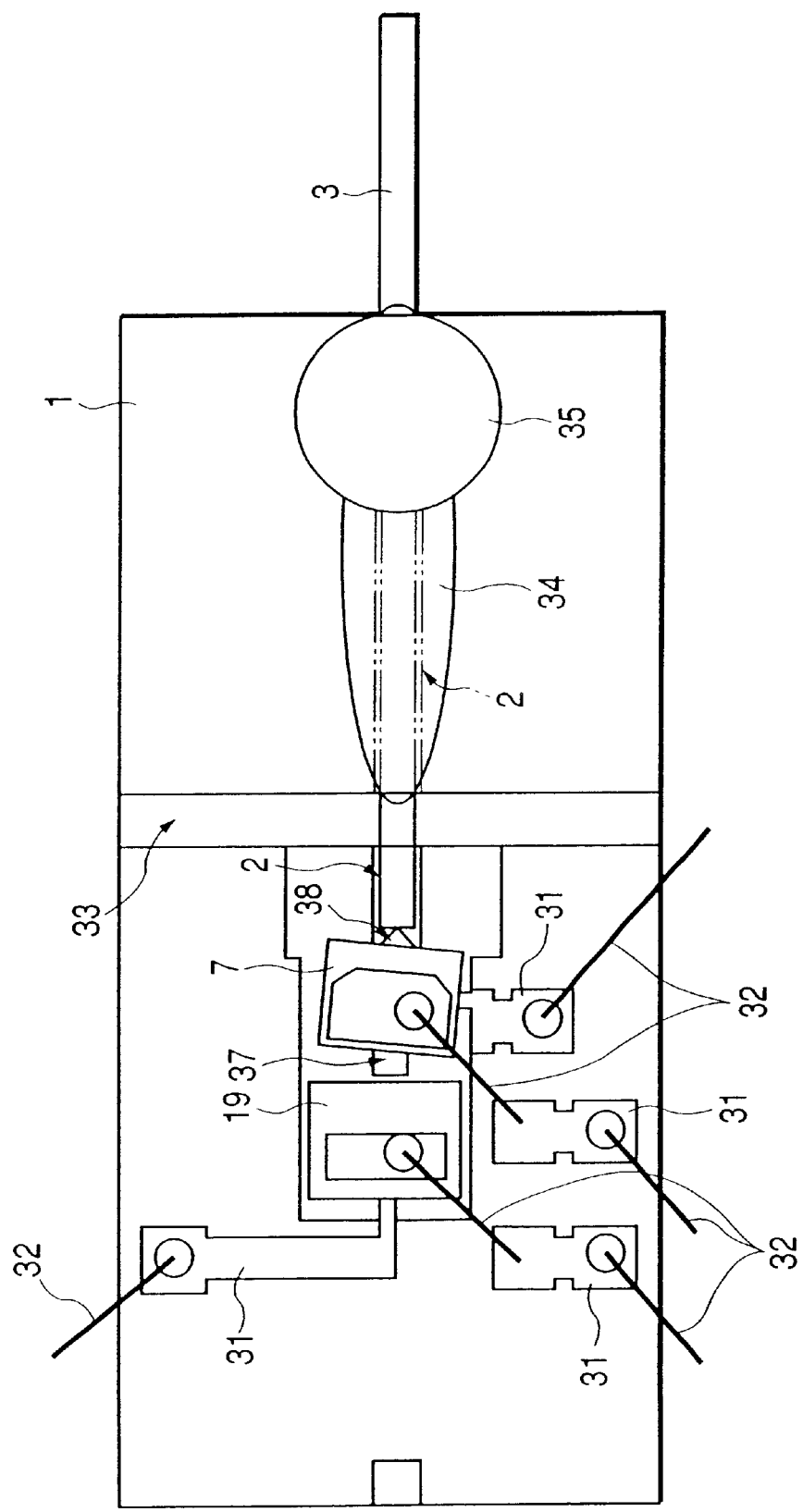
FIG. 5 is an enlarged plan view illustrating a portion of a silicon platform in an optoelectronic device of Embodiment 1.

FIG. 1 to FIG. 6 are views for an optoelectronic device in one embodiment (Embodiment 1) of this invention. FIG. 1 is a cross sectional view for a portion of a platform showing a semiconductor laser chip, a photodetector and a portion of an optical fiber, FIG. 2 is a perspective view illustrating the appearance of an optoelectronic device, FIG. 3 is a c ross sectional view along an extending direction of an optical fiber, FIG. 4 is a plan view in a state of removing a cap and silicon gel as a guard layer and FIG. 5 is a schematic enlarged cross sectional view for a portion of a platform.

An optoelectronic device (semiconductor optical module) 20 of Embodiment 1 comprises, as shown in FIG. 2, a casing 21, a cap 22 f fixed on the casing 21 to form a package (sealed body) 23 in view of the appearance. The casing 21 and the cap 22 comprise a rectangular main body 21a and 22a and a guide portion 21b and 22b protruded length width from the center at one end of the main body 21a and 22a, respectively.

At the guide portion 21b, 22b, an optical fiber cable 25 is guided and the optical fiber cable 25 is protruded from the top end of the guide portion 21b, 22b.

A plurality of leads 27 are protruded from both sides of the casing 21. The leads 27 are formed as a dual-in-line type in this Embodiment 1.

As shown in FIG. 3 and FIG. 4, a base plate 30 made of a metal plate is disposed at the inner bottom of the casing 21. Further, inner ends of the leads 27 are situated respectively to the periphery of the base plate 30. The base plate 30 and the leads 27 are assembled into the casing 21 upon molding the casing 21.

The optical fiber 25 is guided in the guide portion 21b of the casing 21. A silicon platform (platform comprising a silicon single crystal) 1 is fixed by way of a connecting material 29 (refer to FIG. 4), for example, a silver paste on the base plate 30 on the extension of the optical fiber axis of the optical fiber cable 25.

The optical fiber cable 25 is covered with a jacket (fiber jacket) as a guard tube. The fiber jacket is present as far as the midway of the guide portion 21b of the casing 21, but the fiber jacket is peeled at the top end to expose the optical fiber 3 comprising a core 3a and clad 3b (refer to FIG. 1). The portion of the optical fiber 3 is fitted along the groove 2 formed on the silicon platform 1 as shown in FIG. 5. Then, in this structure, a semiconductor laser chip (LD) 7 as an optoelectronic transducer and a photodetector (photodiode PD) 19 are fixed serially on the silicon platform 1 along the extension thereof. Further, optical fiber 3 is fixed to the inner end of the guide portion 21b by means of adhesives 36 made of a thermosetting resin.

A laser beam emitted from the front facet of the semiconductor laser chip 7 is taken from the top end to the inside of the optical fiber 3 and a laser beam emitted from the rear facet is monitored for the optical power intensity by the photodetector 19. The light emitting part in this Embodiment 1 is the semiconductor laser chip 7 and the light receiving part is the photodetector 19 and the optical fiber 3.

As shown in FIG. 5, a patterned electroconductive metallized layer 31 is disposed to the surface of the silicon platform 1. The metallized layer constitutes mounting portions for mounting the semiconductor laser chip 7 and the photodetector 19 and bonding pads that connect conductive wires. Then, after stacking the semiconductor laser chip 7 and the photodetector 19 on the mounting portion such that their lower electrodes 45 and 46 are in contact therewith, the mounting portions are melted by heating to form bonding layers 41 and 42, and the lower electrodes 45 and 46 are fixed to the silicon platform 1 (refer to FIG. 1).

In the fixing structure of the semiconductor laser chip 7, a structure that the end of the bonding layer 41 for fixing the semiconductor laser chip 7 to the platform 1 recedes inward of the emitting facet 43 for emitting a beam is adopted. This structure intends, when the end of the bonding layer 41 raises and protrudes to the emitting facet 43, to prevent the protruding portion from projecting into the optical channel to lower the amount of the beam to be transmitted or shut the beam and not transmit the same at all.

For example, the distance a from the end of the lower electrode 45 and the bonding layer 41 to the emitting facet 43 of the semiconductor laser chip 7 is, for example, about 10 to 40 $\mu$m in view of the length caused by the scattering for the cleaving position upon forming the semiconductor laser chip 7 by cleaving. Further, in a case of a semiconductor laser chip 7 having unevenness in a stripe portion corresponding to an optical waveguide of the semiconductor laser chip 7, a distance b between the lower surface of the semiconductor laser chip 7 and the main surface of the silicon platform 1 is made, for example, 4 to 7 $\mu$m.

Further, since both of the semiconductor laser chip 7 and the photodetector 19 have electrodes disposed on the upper surface and the lower surface, the lower electrodes 45 and 46 are electrically connected respectively with predetermined metallized layers 31.

A portion of the metallized layer in contiguous with the mounting portion and the inner end of predetermined leads 27 are connected with a conductive wires 32 as shown in FIG. 5 and FIG. 4. Further, the upper electrodes of the semiconductor laser chip 7 and the photodetectors 19 are fixed by way of conductive wires 32 to metallized layers independent of each other, and a portion of the metallized layer is electrically connected by way of a wire 32 to the inner end of a predetermined lead 27.

Further, a saw cut 33 is disposed perpendicular to the groove 2 disposed to the surface of the silicon platform 1 (refer to FIG. 5). The optical fiber 3 passes over the saw cut 33 but the protruding length beyond the saw cut is extremely short. For example, the protruding length is about 100 $\mu$m. Further, the diameter of the optical fiber 3 is, for example, about 125 $\mu$m.

The optical fiber 3 is fixed, as shown in FIG. 5, to the silicon platform 1 near the saw cut 33 by means of fixing with two kinds of adhesives of the primary fixing portion 34 and the secondary fixing portion 35. The primary fixing portion 34 is formed by UV-ray setting adhesive while the secondary fixing portion 35 is formed by a thermosetting resin.

As shown in FIG. 5, the primary fixing portion 34 is formed lengthwidth along the optical axis of the optical fiber 3. After inserting and positioning the optical fiber 3 along the groove 2, the UV-ray setting adhesive is coated, and the UV-rays are irradiated to set the UV-ray setting adhesive to conduct primary fixing (provisional fixing). The optical fiber 3 is reliably fixed to the silicon platform 1 by the primary fixing. Accordingly, the secondary fixing as the main fixing is conducted subsequently. The secondary fixing is conducted by coating a thermosetting resin to the optical fiber fixed by the primary fixing portion 34 at a portion remote from the semiconductor laser chip 7 and then applying thermosetting. The secondary fixing treatment can be applied batch processing to enhance the productivity.

In the primary fixing treatment and the secondary fixing treatment, adhesives such as UV-ray setting adhesive and thermosetting resin are coated so as not to exceed the saw cut 33 as a yardstick. Further, since the adhesive entering the saw cut 33 is guided to the side of the silicon platform 1 through the saw cut 33, the adhesive does not intrude between the top end face of the optical fiber 3 and the emitting facet of the semiconductor laser chip 7, so that it does not hinder the transmitting/receiving of the optical beam.

On the other hand, as one of the features of this invention, as shown in FIG. 1 and FIG. 3, concaves 37 and 38 are disposed to the main surface of the silicon platform 1 corresponding to the region between the semiconductor laser chip 7 as the light emitting part and the photodetector 19 as the light receiving part, and to the region between the semiconductor laser chip 7 and the optical fiber 3 as the light receiving part.

In the concave 37 disposed to the main surface of the silicon platform 1 between the semiconductor laser chip 7 and the photodetector 19, the edge 37a of the concave 37 on the side of the semiconductor laser chip (light emitting part) 7 is situated closer to the semiconductor laser chip (the light emitting part) than to the end face (emitting facet 43) of the semiconductor laser chip 7. That is, the edge 37a situates below the semiconductor laser chip 7, and the end face (emitting facet 43)-of the semiconductor laser chip 7 protrudes beyond the edge 37a of the concave 37 into the concave 37.

Accordingly, an open region is formed at the end of the bonding layer 41. In this embodiment, as shown in FIG. 1, the end of the bonding layer 41 is aligned with the position for the edge 37a.

Further, the edge 38a of the concave 38 disposed between the optical fiber 3 and the semiconductor laser chip 7 on the side of the semiconductor laser chip 7 is also situated inward of the emitting facet 43 of the semiconductor laser chip 7 and situated below the semiconductor laser chip 7. Thus, an open region (open space) is also formed on the side of the optical fiber of the semiconductor laser chip 7. The concave 38 is formed of an extended portion of the groove 2.

Since the concaves 37 and 38 are formed by etching simultaneously with the groove 2 for fixing the optical fiber 3, it does not increases the number of steps.

Further, a guard film (silicone gel) 6 which is transparent to the optical beam transmitted by the optical fiber 3 and which has moisture proofness is filled in the casing 21 (refer to FIG. 1 and FIG. 3), and the base plate 30, the silicon platform 1, the optical fiber 3, the semiconductor laser chip 7 and the photodetector 19 are covered with the silicone gel 6 to improve the moisture proofness. The guard film 6 is not restricted to the silicon gel but may be of other materials such as silicone rubber, low stress epoxy resin, acrylic resin or urethane resin.

Due to the presence of the concaves 37 and 38, since the open space is formed between the semiconductor laser chip 7 and the photodetector 19 and between the semiconductor chip 7 and the optical fiber 3, voids are less formed in the concaves 37 and 38 upon injection of the silicone gel 6 into the casing 21 and subsequent thermosetting treatment by heating. As a result, the transmitting/receiving state of the optical beam between the semiconductor laser chip 7 and the optical fiber 3, which would be deteriorated caused by the presence of the voids, can be enhanced and the photodetector 19 can stably receive a laser beam 11 emitted from the rear facet of the semiconductor laser chip 7.

After injecting (filling) the silicone gel 6, the casing 21 is entirely put in an atmosphere at a predetermined vacuum degree for a predetermined period of time to be applied with defoaming treatment. For example, the casing 21 is left in an atmosphere at a vacuum degree of 60 torr about for 4 to 5 min to undergo defoaming treatment. In the defoaming treatment, voids formed in the silicone gel 6 are moved in the silicone gel 6 by the vacuum suction and then released successively from the surface of the silicone gel 6. While a small gap is present at the end of the connection portion of the semiconductor laser chip 7 with the bonding layer 41, since the gap forms an open space by the presence of the concave 37 as described above, voids formed on the end of the connection portion by the bonding layer 41 of the semiconductor laser chip 7 can easily move to the open region without being captured in the small gap at the end of the connection portion, so that defoaming is conducted from the surface of the silicone gel 6.

While the voids in the silicone gel 6 tend to move by the vacuum defoaming treatment, voids in a state adhered to the lower surface of the semiconductor laser chip 7 are less moved. However, in this Embodiment 1, the end of the semiconductor laser chip 7 protrudes greatly from the end of the bonding layer 41, that is, from the edge 37a of the concave 37 as long as by a. Accordingly, in the voids moving along the lower surface of the semiconductor laser chip 7 upon vacuum defoaming treatment, voids at the top end easily move to the open space and are defoamed from the surface of the silicone gel 6, while the voids situated at the deep inside stay stationary in the midway of the lower surface of the semiconductor laser chip 7, so that they do not act as voids that inhibit the laser beam 11 of the semiconductor laser chip 7.

Upon thermosetting treatment on the silicone gel 6, when contracting in thermo-curing occurs to the silicone gel 6 and a gap due to contracting in thermo-curing tends to occur in a small gap at the end of the connection portion by the bonding layer 41 of the semiconductor laser chip 7, since the open space is present and the great amount of silicone gel moves so as to fill the gap, also the gap caused by the contracting in thermo-curing less occurs.

Figure 6:
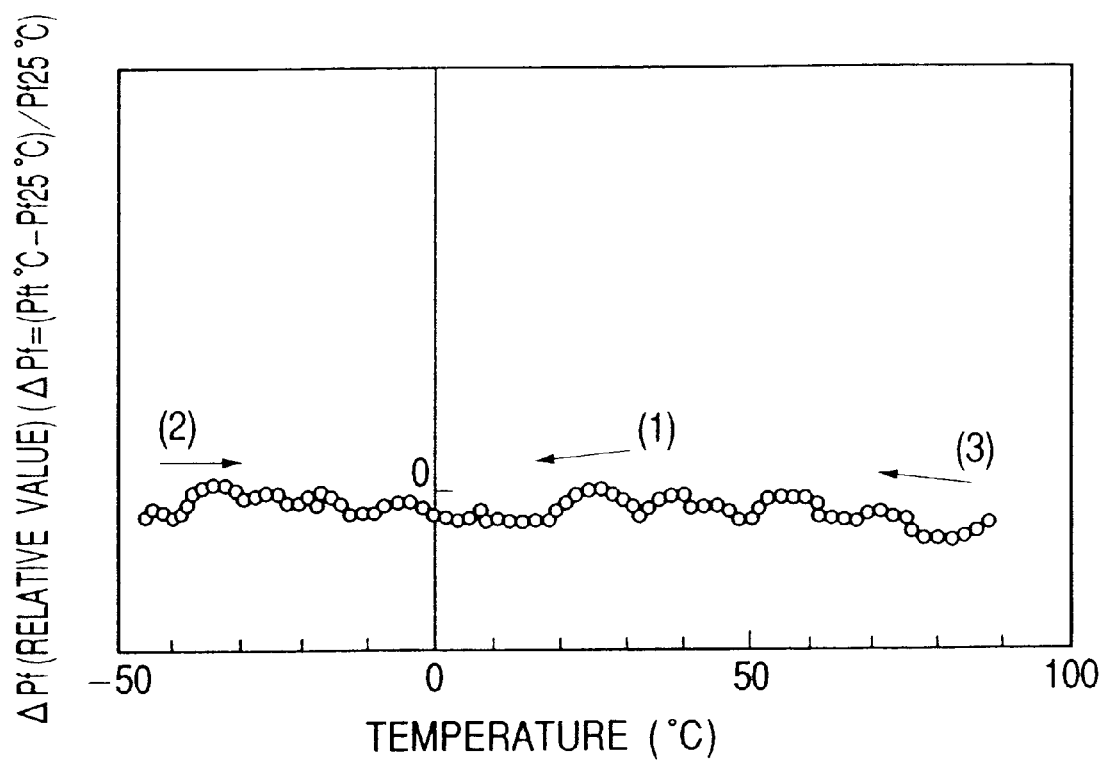
FIG. 6 is a graph illustrating Is tracking characteristic in an optoelectronic device of Embodiment 1.

FIG. 6 is a graph illustrating an Is tracking characteristic in the optoelectronic device 20 of this Embodiment 1. In the graph, the horizontal axis indicates the temperature while the vertical axis indicates a relative value of the power (ΔPf). ΔPf is a value obtained by subtracting Pf value at 25° C. from the Pf value at t° C. and dividing the subtracted value by the Pf value at 25° C.

As seen in the graph, ΔPf is determined by (1) lowering the temperature from 25° C. to −40° C. successively, (2) elevating the temperature successively from −40° C. to 85° C. and (3) lowering the temperature successively from 85° C. to −40° C.

Figure 14:
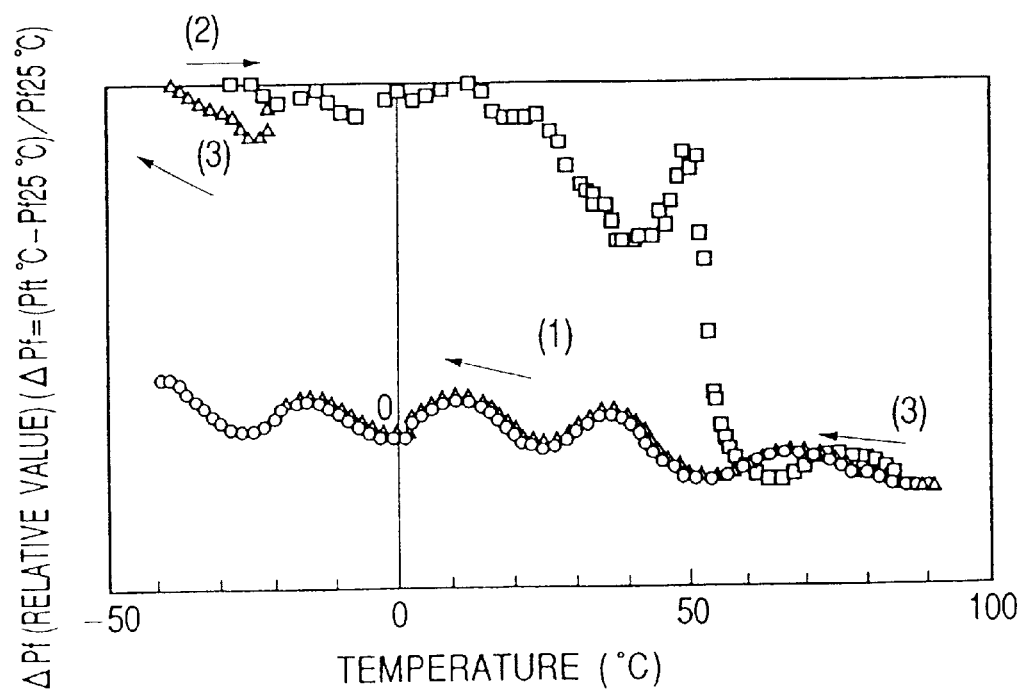
FIG. 14 is a graph illustrating Is tracking characteristic in an optoelectronic device developed by the present applicant.
Figure 15:
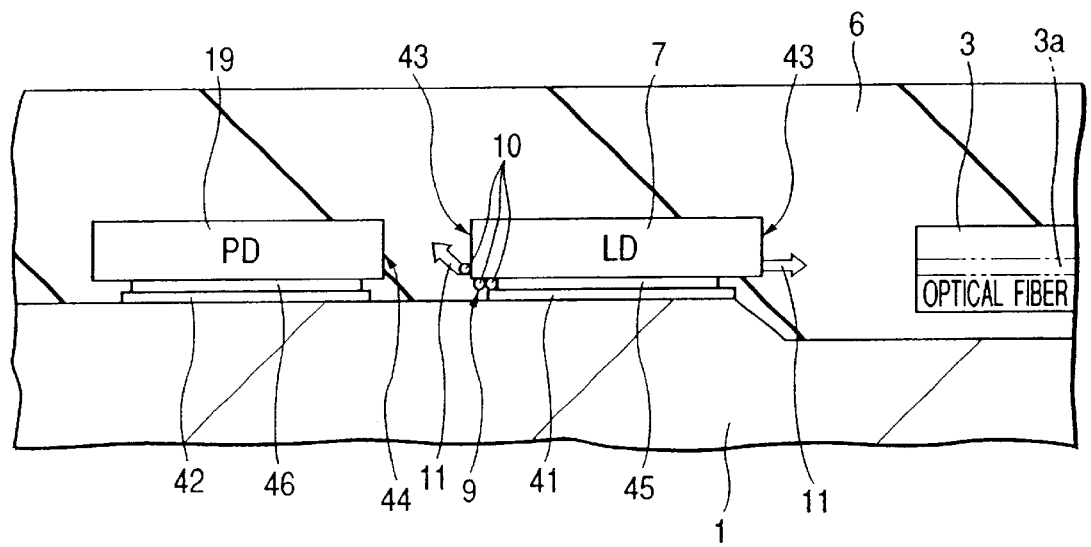
FIG. 15 is an enlarged cross sectional view illustrating a portion of a silicon platform in an optoelectronic device developed by. the present applicant.

As can be seen from the graph, it does not draw a hysteresis loop as in the graph shown in FIG. 14 and the optoelectronic device 20 according to this Embodiment 1 has ΔPf always in a substantially constant region relative to the temperature change, and a laser beam can be monitored stably.

On the other hand, a cap 22 is fixed by means of an adhesive to the casing 21. For the adhesive, a thermosetting resin for fixing the optical fiber 25 to the guide portions 21b, 22b is used.

Figure 16:
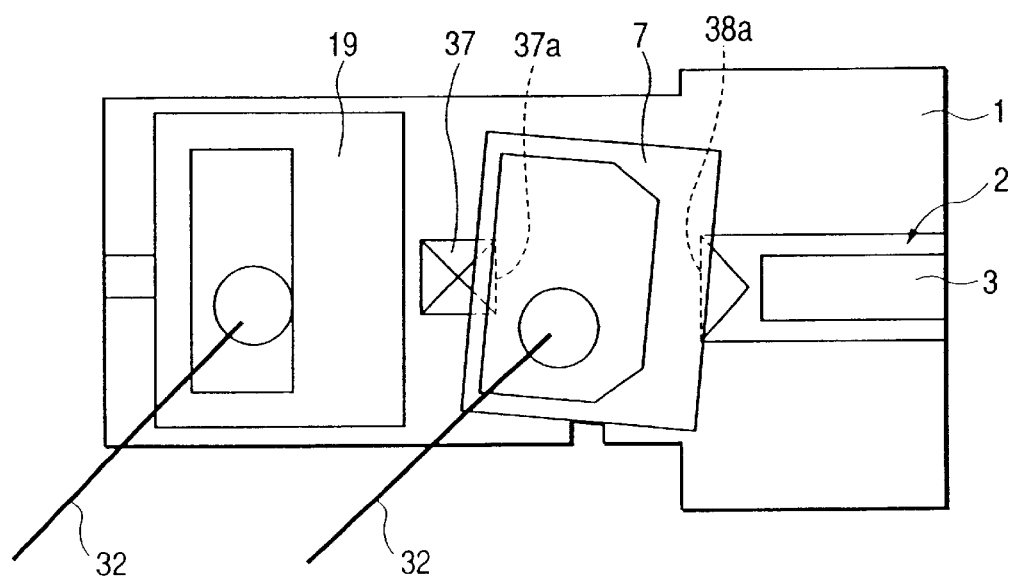
FIG. 16 is an enlarged plan view illustrating a positional relationship for a laser chip, a concave and a photodetector in a laser chip of an optoelectronic device of Embodiment 1.
Figure 17:
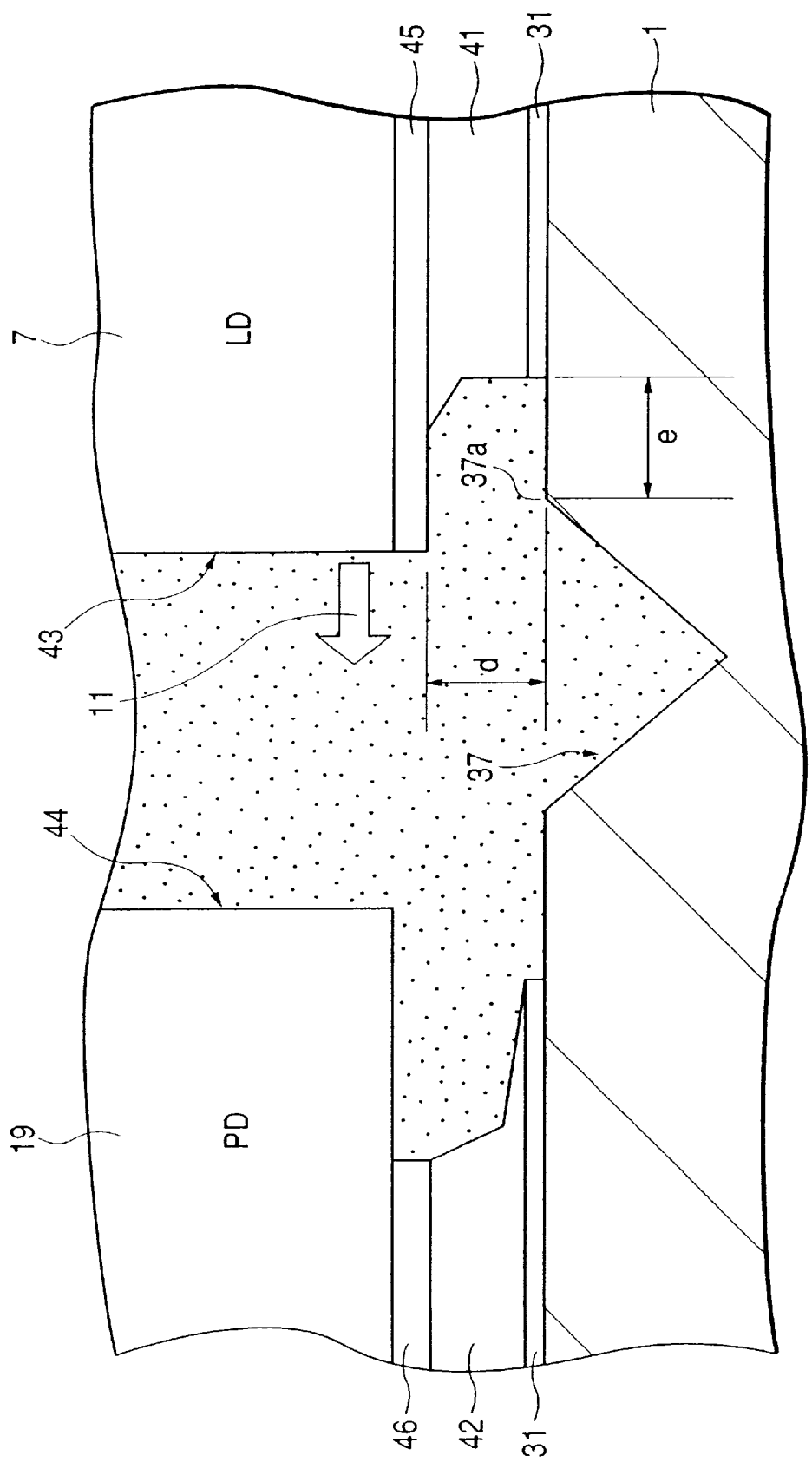
FIG. 17 is an enlarged cross sectional view for a rear emitting facet of a laser chip of an optoelectronic device of Embodiment 1.

FIG. 16 and FIG. 17 show a modified embodiment of this Embodiment 1 which is an example of forming a lower electrode 45 of a semiconductor laser chip 7 over the entire rear face of the semiconductor laser chip 7. FIG. 16 is a schematic enlarged planer view showing a positional relationship for a semiconductor laser chip, a concave and a photodetector of the optoelectronic device and FIG. 17 is a schematic enlarged cross sectional view of the semiconductor laser chip rear facet of the optoelectronic device.

Also in this example, a semiconductor laser chip 7 and a concave 37 are in an identical positional relationship with that shown in FIG. 1. That is, the concave 37 is disposed to the portion of the main surface of a silicon platform 1 between the semiconductor laser chip 7 and the photodetector 19. Then, an edge 37a of the concave 37 on the side of the semiconductor laser chip 7 is situated closer to the semiconductor laser chip 7 than to the end face (emitting facet 43) of the semiconductor laser chip 7. In other words, the edge 37a is situated below the semiconductor laser chip 7 and the end face (emitting facet 43) of the semiconductor laser chip 7 protrudes beyond the edge 37a of the concave 37 into the concave 37.

It is desired that the concave 37 is disposed at the end of a bonding layer 41 but, at d of about 5 μm, voids are not formed when e is 15 μm or less as shown in FIG. 17. That is, in this example, since a lower electrode 45 is disposed over the entire length of the semiconductor laser chip 7, the distance between the semiconductor laser chip 7 at the end facing the concave 37 and the main surface of the silicon platform 1 is only for thickness of the bonding layer 41, so that a low and deep gap is formed. However, since an open region (space) formed by the concave 37 is present in adjacent therewith, the defoaming treatment acts effectively and voids less remain in the silicone gel 6.

Figure 18:
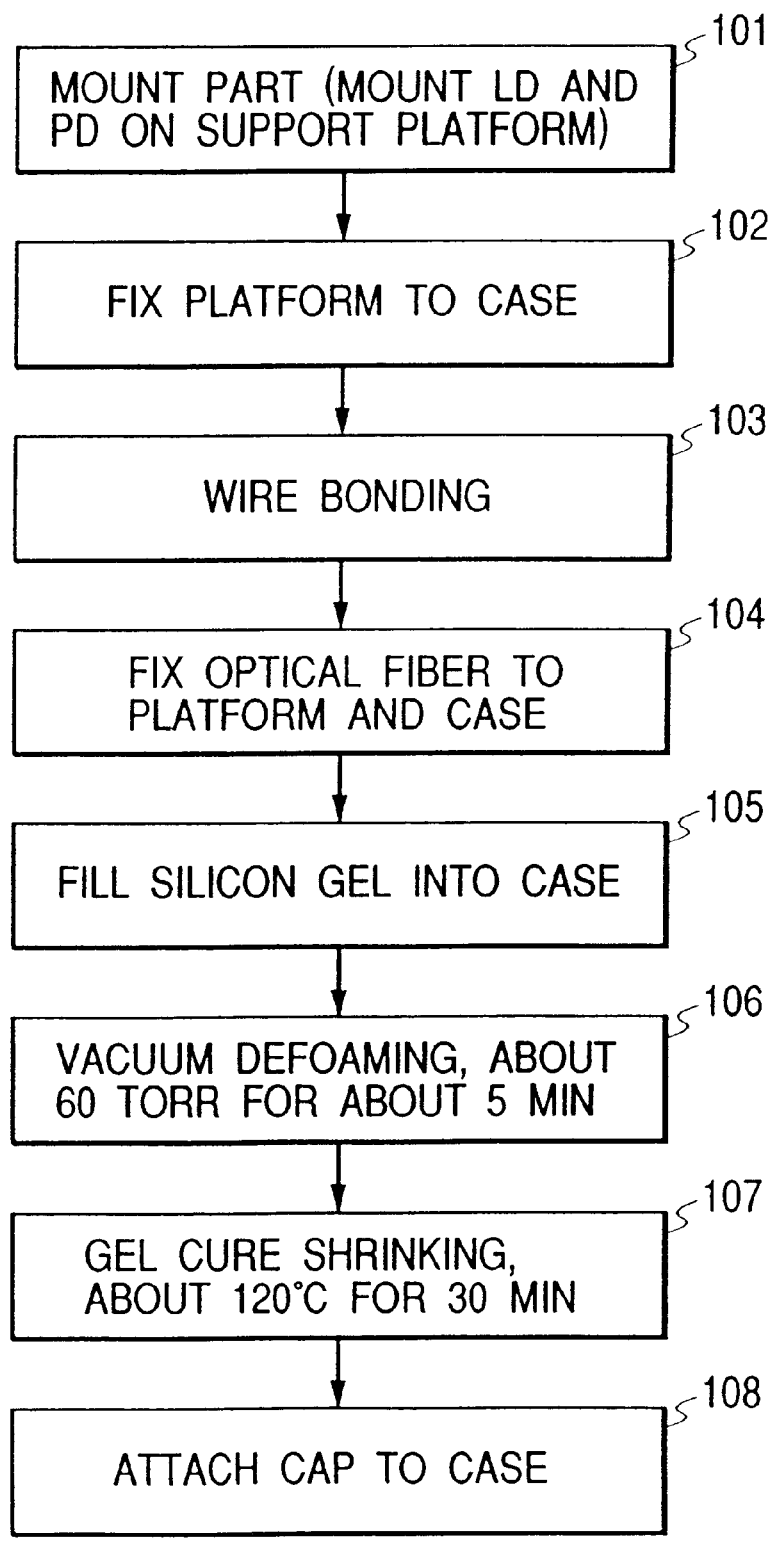
FIG. 18 is a flow chart showing a manufacturing method of an optoelectronic device of Embodiment 1.

Then, a method of manufacturing the semiconductor optical module 20 is to be explained with reference to a flow chart shown in FIG. 18. As shown in the flow chart of FIG. 18, the semiconductor optical module 20 is manufactured by each of the steps of mounting parts (mounting LD and PD on platform): step 101 [S101]), bonding wires (S102), fixing the platform to the casing (S103), fixing the optical fiber to the platform and the casing (S104), filling the silicone gel into the casing (S105), applying vacuum defoaming treatment (S106), applying gel contracting in curing (S107) and attaching the cap to the casing 21 (S108).

At first, a casing 21 made of a plastic material with a guide for guiding an optical fiber 3, a cap 22 made of a plastic material attached so as to close the casing 21 and a silicon platform 1 mounting a semiconductor laser chip 7 and a photodetector 19 on one surface and having a groove 2 for guiding an optical fiber 3 extending toward the semiconductor laser chip 7 are provided.

The silicone platform 1 has, on the main surface thereof, concaved 37 and 38 as described previously between a region of fixing (mounting) the semiconductor laser chip and a region of fixing (mounting) the photodetector and between a region for fixing the semiconductor laser chip and a region of disposing the optical fiber.

On one surface (main surface) of the silicon platform 1, a metallized layer 31 of a predetermined pattern is disposed, a portion of which constitutes a bonding pad connecting the mounting portion or wire. Further, a saw cut 33 is disposed intersecting the groove 2 disposed to the main surface of the silicon platform 1. The saw cut 33 serves to guide an adhesive which enters upon fixing the optical fiber 3 to the outside and prevent the adhesive from flowing toward the semiconductor laser chip 7.

The casing 21 and the cap 22 having the structure as described above.

Then, the semiconductor layer chip (LD) 7 and the photbdetector (PD) 19 are fixed at respective predetermined mounting portions on the silicon platform 1 (S101). Since both of the semiconductor laser chip 7 and the photodetector 19 have electrodes on the upper surface and the lower surface, the lower electrodes (lower electrodes 45 and 46) are electrically connected respectively with the mounting portions by the joining structure.

Then, the silicon platform 1 is fixed by way of a connecting material 29, for example, a silver paste on the base plate 30 in the casing 21 (S102).

Then, wire bonding is applied (S103). That is, the upper electrodes of the semiconductor laser chip 7 and the photodetector 19 are electrically connected with predetermined metallized layers 31 by means of wires 32. Further, predetermined metallized layers 31 and the inner end portions of the leads 27 attached to the casing 21 are electrically connected by way of the wires 32 (refer to FIG. 4 and FIG. 5).

Then, the optical fiber 3 is fixed to the silicon platform 1 and the casing 21 (S104). The optical fiber cable 25 is fixed before fixing the optical fiber 3.

That is, the optical fiber cable 25 peeled with the jacket portion for a predetermined length at the top end to expose the optical fibers 3 is inserted into the guide portion 21b. Then the semiconductor laser chip 7 is operated to emit a laser beam and the emitted beam is taken from the top end to the inside of the optical fiber 3 and optical coupling adjustment is conducted while detecting the optical power. A thermosetting resin (for example, epoxy resin) is coated to the inner end of the guide portion 21b to conduct adhesion at the instance the optical coupling adjustment has been completed. As a result, the optical fiber 3 is fixed to the inner end of the guide portion 21b by the adhesive 36 of the thermosetting resin. When the optical fiber 3 is fixed to the inner end of the guide portion 21b, it may be conducted by well-known passive alignment not emitting the laser beam.

Then, a UV-ray setting adhesive is partially coated to the groove 2 to apply primary fixing to the optical fiber 3. That is, after coating the UV-ray setting adhesive on the groove 2 of the silicon platform 1, the optical fiber 3 is pressed to the bottom of the groove 2 so as to urge the optical fiber 3 to the UV-ray setting adhesive. Further, the semiconductor laser chip 7 is operated to emit a laser beam and the emitted beam is take from the top end to the inside of the optical fiber 3 and optical coupling adjustment is conducted while detecting the optical power.

Then, UV-rays are irradiated to the UV-ray setting adhesive by using a UV-ray irradiation fiber or the like to set the UV-ray setting adhesive. A primary fixing portion 34 is formed by the UV-ray setting adhesive. The inner end of the primary fixing portion 34 faces the saw cut 33 and extends for relatively long distance along the groove 2. After the primary fixing, the optical fiber 3 is not detached out of the groove 2 even when the silicon platform 1 is moved and the state of optical axis alignment between the semiconductor laser chip 7 and the optical fiber 3 no more changes.

Then, a thermosetting resin is coated on the optical fiber 3 on the primary fixing portion 34 remote from the saw cut 33 and thermosetting is applied to form a secondary fixing portion 35 by the thermosetting resin. The secondary fixing portion 35 has a structure covering the optical fiber 3 thereacross and firmly fixes the optical fiber 3 to the silicon platform 1 (refer to FIG. 5).

As a result, the optical fiber 3 is fixed near the saw cut 33 to the silicon platform 1 by fixing with two kinds of adhesives of the primary fixing portion 34 and the secondary fixing portion 35. Since the secondary fixing is the treatment after the primary fixing, batch processing is possible. The batch processing can improved the productivity.

Then, a silicone gel 6 is filled in the casing 21 to cover the silicon platform 1, the optical fiber 3, the semiconductor laser chip 7 and the photodetector 19 (S105) The silicone gel 6 is filled so as to improve the moisture proofness.

Then, vacuum defoaming treatment is applied for removing voids in the silicone gel 6 (S106). That is, after injecting (filling) the silicone gel 6, the casing 21 is entirely put in an atmosphere of a predetermined vacuum degree for a predetermined period of time to be applied with the deforming treatment. For example. the casing 21 is left in an atmosphere of 60 torr vacuum degree for about 4 to 5 min to undergo the deforming treatment.

By the defoaming treatment, the voids formed in the silicone gel 6 are moved in the silicone gel 6 by the vacuum suction and released successively gradually from the surface of the silicone gel 6. While a small gap is present at the end of the connection portion of the semiconductor laser chip 7 with the bonding layer 41, since the gap forms an open region (open space) by the presence of the concave 37 as described above, so that also the voids formed at the end of connection portion with the bonding layer 41 of the semiconductor laser chip 7 can easily move to the open region without being captured in the small gap at the end of the connection portion, so that they can be defoamed from the surface of the silicone gel 6.

Further, while the voids in the silicone gel 6 tend to be moved by the vacuum defoaming treatment, voids in the state of adhering lower surface of the semiconductor laser chip 7 are less move. However, in this Embodiment 1, the end of the semiconductor layer chip 7 protrudes as long as by a from the end of the bonding layer 41, that is, from the edge 37a of the concave 37. Accordingly, in the voids moving along the lower surface of the semiconductor laser chip 7 upon defoaming treatment, those voids at the top ends are easily moved in the open region and deformed from the surface of the silicone gel 6, while those voids situated at the deep inside are in a state of staying stationary in the midway of the lower surface of the semiconductor laser chip 7, so that they no more act as voids that inhibit the laser beam 11 of the semiconductor chip 7.

Accordingly, by the defoaming treatment, voids are not situated in the optical channel, and lowering of the optical coupling efficiency between the semiconductor laser chip 7 and the optical fiber 3 and lowering of the optical coupling efficiency between the semiconductor laser chip 7 and the photodetector 19 due to the voids no more occur. As a result, stable laser beam intensity monitoring by the photodetector 19 can be attained.

Then, gel contracting in curing treatment is conducted (S107). In the gel contracting in curing treatment, the casing 21 is entirely placed in a predetermined furnace and heated at a predetermined temperature for a predetermined period of time to undergo a thermosetting treatment. For example, the casing 21 is heat treated in an atmosphere at about 120° C. for about 30 min. By the thermosetting treatment, the viscosity increases to 40–60 poise, and the silicone gel 6 of a heat expansion coefficient of $3.1 \times 10^{-4}/°$ C. is cured.

In the thermo-curing treatment for the silicone gel 6, when contracting in thermo-curing occurs to the silicone gel 6 and a gap due to the contracting in thermo-curing tends to occur in a small gap at the end of the connection portion with the bonding layer 41 of the semiconductor laser chip 7, since the open region with the concave 37 is present, a great amount of the silicone gel moves so as to fill the gap, occurrence of gaps due to the contracting in thermo-curing is also suppressed.

Accordingly, voids are not situated in the optical channel, lowering of the optical coupling efficiency between the semiconductor laser chip 7 and the optical fiber 3 caused by voids no more occurs and stable laser beam intensity monitoring by the photodetector 19 can be attained.

Then, the cap 22 is adhered by means of an adhesive to the casing 21 and the adhesive is baked to fix the cap 22 to the casing 21 (S108). In this case, the thermosetting resin 36 is filled as the adhesive in the guide portions 21b, 22b for the casing 21 and the cap 22 and the thermosetting resin 36 is set to fix the casing 21 and the cap 22.

Further, although not described specifically, the optical fiber 3 may be fixed at a predetermined portion by using other bonding material.

In the optoelectronic device manufactured in the manufacturing method as described above, voids are not situated in the optical channel, lowering of the optical coupling efficiency between the semiconductor laser chip 7 and the optical fiber 3 caused by voids no more occur and stable laser beam intensity monitoring can be attained by the photodetector 19.

Further, lowering of fixing strength of the optical fiber 3 and the fixing reliability due to the voids does not occurs, and it is possible to prevent the occurrence of disadvantages such as lowering of the moisture proofness due to the voids and freezing of trapped water in the voids. That is, even when water intrudes from the outside along the optical fiber 3, intrusion of the water is inhibited at the primary fixing portion 34 and the secondary fixing portion 35 and, in addition, since no nuclei such as void in the silicone gel that trap water are not present, trapping for water no more occurs to improve the moisture proofness.

Figure 7:
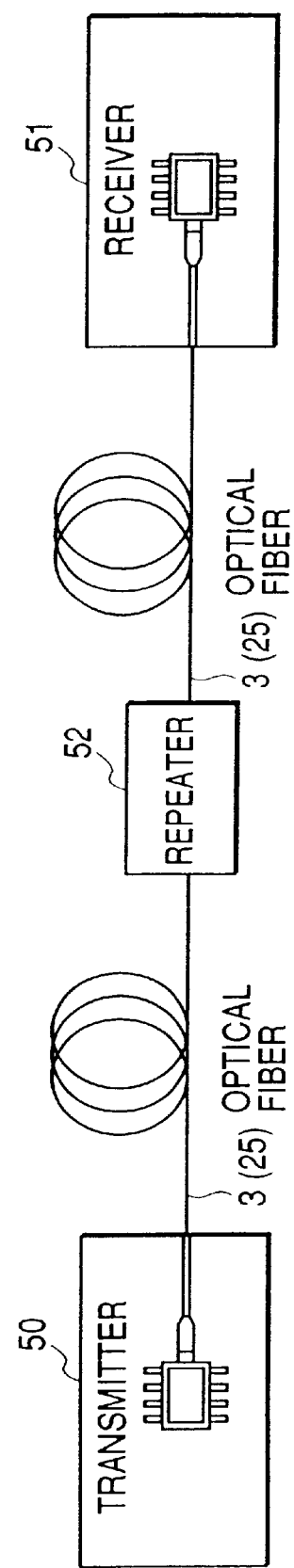
FIG. 7 is a schematic view illustrating an optical communication system using the opt oelectronic device of Embodiment 1.
Figure 8:
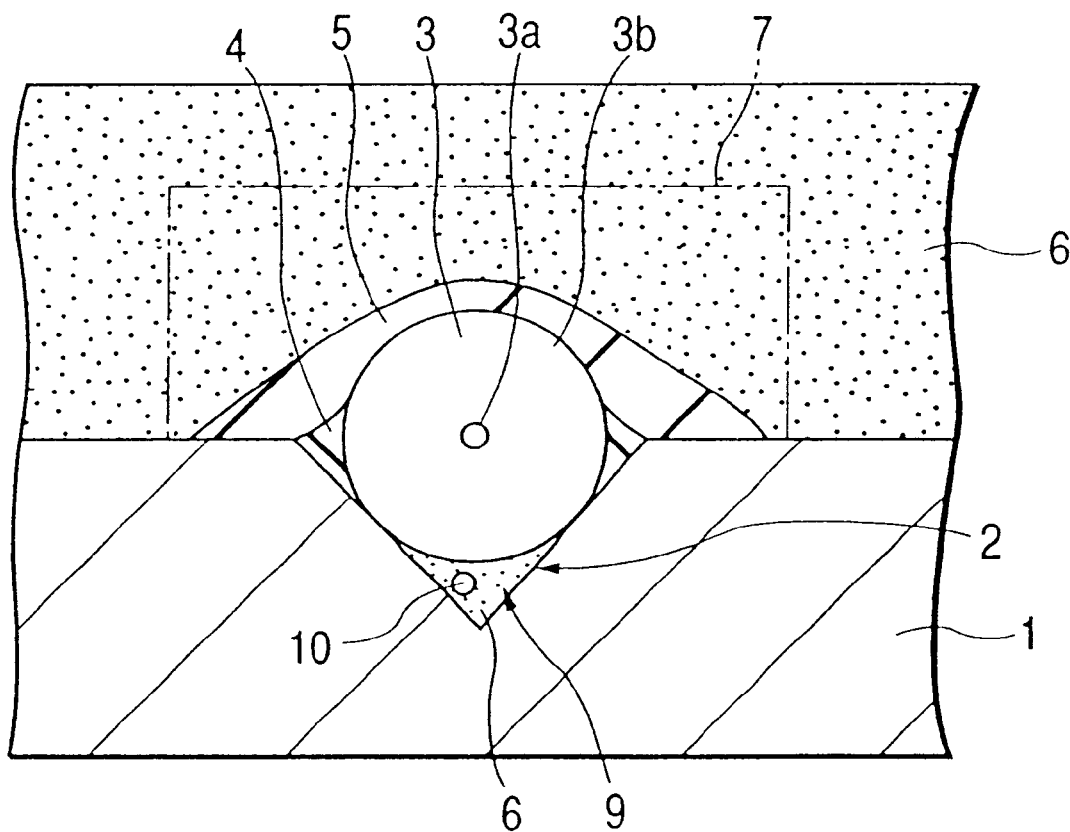
FIG. 8 is a schematic enlarged cross sectional view illustrating a state of formation of voids in a space closed by an optical fiber and a groove in fixing the optical fiber studied by the present applicant.
Figure 9A:
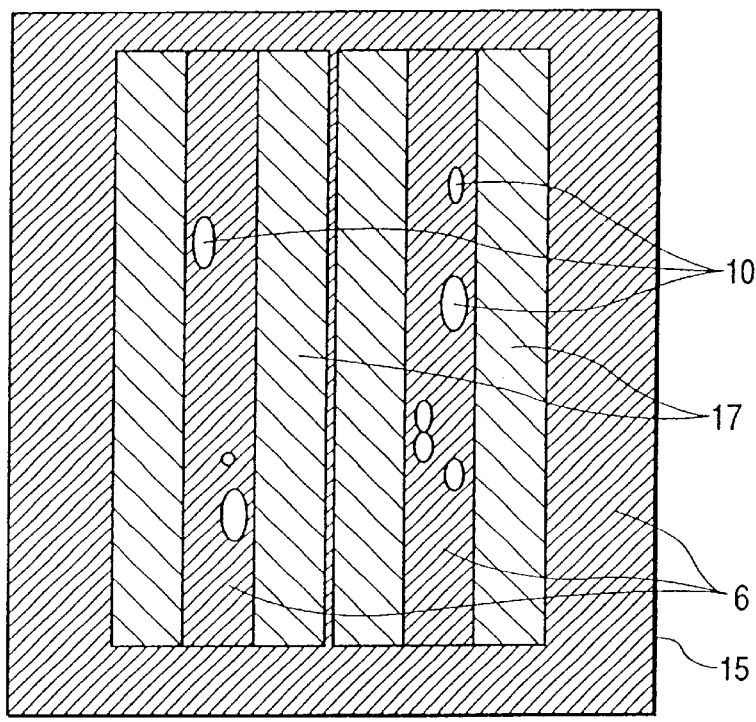
FIG. 9 is a schematic view illustrating a distribution of voids formed at the initial stage of silicone gel curing as the data of experiment conducted by the present applicant.
Figure 9B:
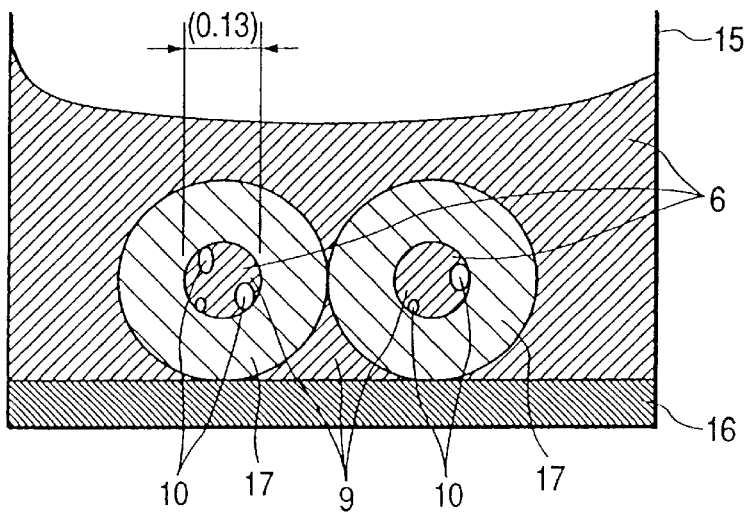
Figure 10A:
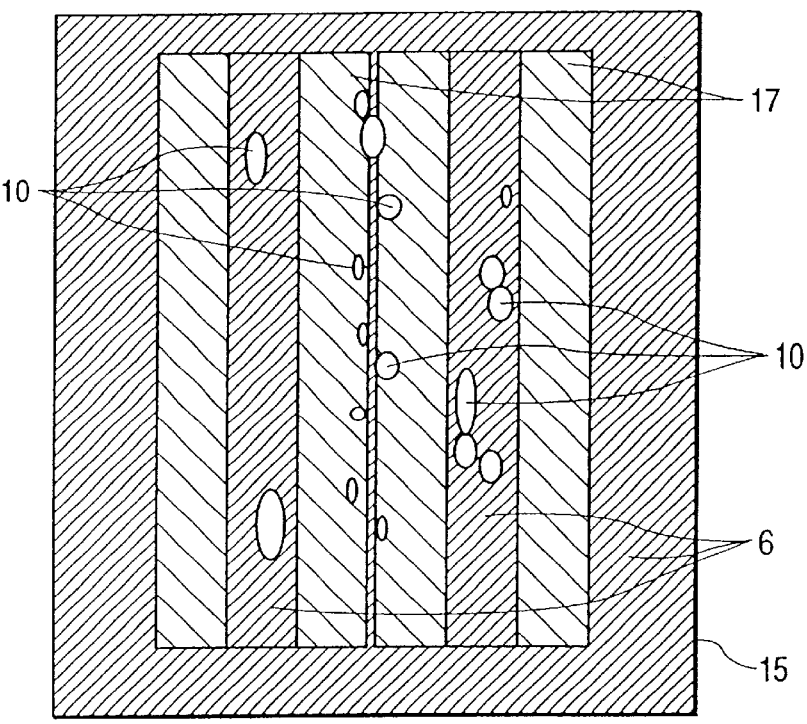
FIG. 10 is a schematic view illustration the distribution of voids formed in a silicone gel by an environmental test such as for temperature cycle as the data of experiment conducted by the present applicant.
Figure 10B:
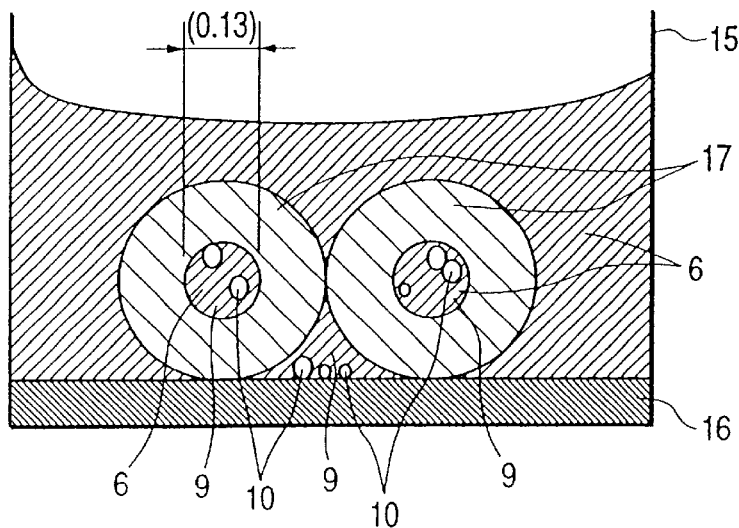
Figure 11:
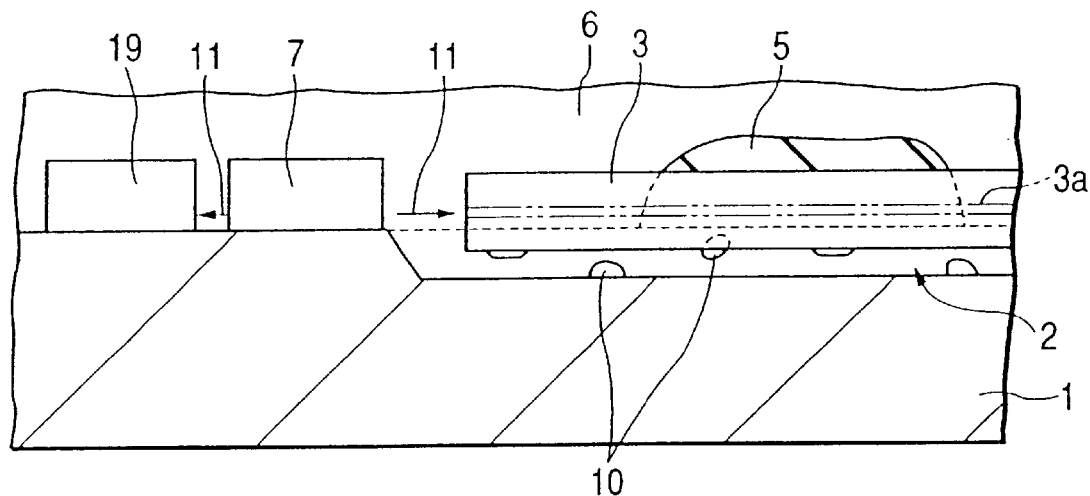
FIG. 11 is a schematic cross sectional view illustrating the phenomenon confirmed by the present applicant and illustrating voids formed in the silicone gel in the groove below the optical fiber.
Figure 12:
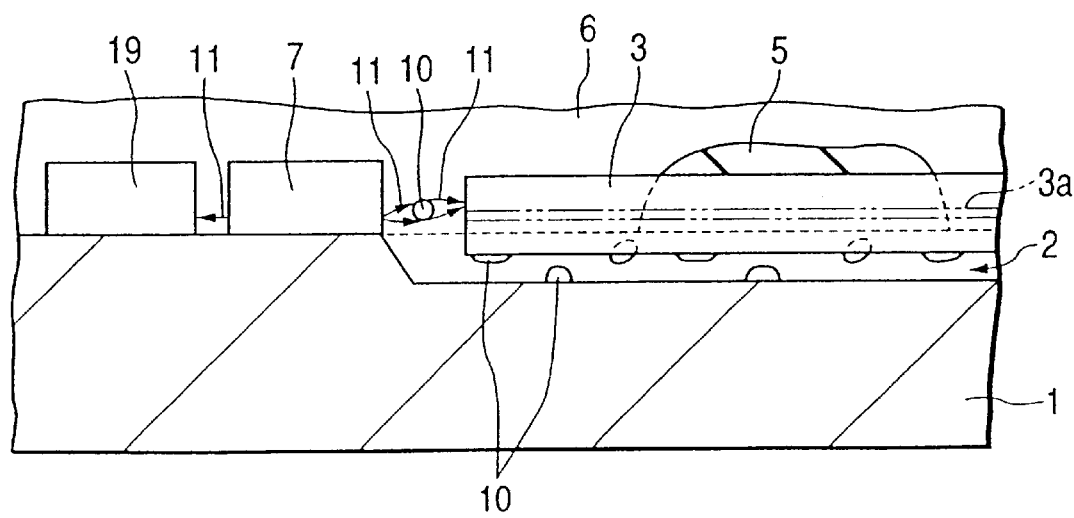
FIG. 12 is a view illustrating a phenomenon confirmed by the present applicant, which is a schematic cross sectional view illustrating voids formed in a silicone gel in the groove below the optical fiber, and between the tip of the optical fiber and the semiconductor laser chip.
Figure 13:
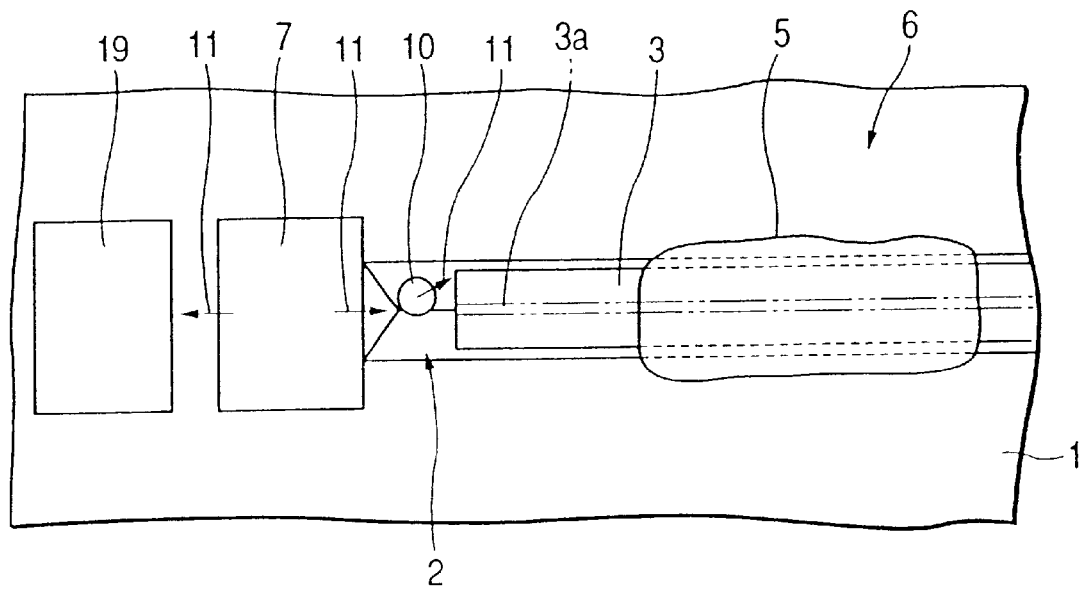
FIG. 13 is a view illustrating a phenomenon confirmed by the present applicant, which is a schematic plan view illustrating a void formed in a silicone gel between the tip of an optical fiber and a semiconductor laser chip.

FIG. 7 is a schematic view illustrating an optical communication system using the optoelectronic device according to Embodiment 1. The optical communication system basically comprises a structure of connecting a transmitter 50 and a receiver 51 by way of an optical fiber 3 (optical fiber cable 25) in which one or plural relays 52 are disposed depending on the distance between the transmitter 50 and the receiver 51 in the midway of the optical fiber 3. In the drawing, only the optoelectronic device 20 constituting the sending device is communicated with the optical fiber 3 in both of the transmitter 50 and the receiver 51 as a schematic view, but, naturally, the receiving device is connected with the optical fiber 3.

In the optical communication system of this embodiment, stable and highly reliable optical communication is possible by incorporation of the optoelectronic device 20 having high optical coupling efficiency between the semiconductor laser chip and the optical fiber and capable of stable laser intensity monitoring by the photodetector.

This Embodiment 1 can provide the following effects.

(1) Since a concave 37 is disposed to a portion of a main surface of a platform 1 between a semiconductor laser chip 7 and a photodetector 19 to form an open space and an edge 37a of the concave 37 on the side of the semiconductor laser chip is situated closer to the semiconductor laser chip than to the end-face (emitting facet 43: rear facet) of the semiconductor laser chip 7, voids in the silicone gel 6 formed in the fixed portion of the semiconductor laser chip 7 near the opened space can be defoamed more effectively and troubles no more occur in the transmitting/receiving of the laser beam between the semiconductor laser chip 7 and the photodetector 19. Accordingly, the monitor current Is of the photodetector 19 less fluctuates to attain stable laser beam intensity monitoring.

(2) A concave 38 is disposed also to a portion of a main surface of the platform 1 between the semiconductor laser 7 and the top end of the optical fiber 3 to form a opened space, and an edge 38a of the concave 38 on the side of the semiconductor laser chip is situated closer to the semiconductor laser chip than to the end face (emitting facet 43 : front emitting facet) of the semiconductor laser chip 7, voids in the silicone gel 6 formed in the fixed portion of the semiconductor laser chip 7 near the opened space are defoamed more effectively and troubles for the transmitting/receiving of a beam between the optical fiber and the semiconductor laser chip no more occur. Further, since also the top end of the optical fiber 3 forms an opened space by the concave 38, voids are no more situated in the optical channel at the top end of the optical fiber 3. Accordingly, the laser beam emitted from the emitting facet of the semiconductor laser chip can be effectively taken into the optical fiber to enable stable optical communication.

(3) Since the optical fiber 3 obtaining the coupling adjustment is primarily fixed to the portion of the groove 2 in the silicon platform 1 by of an UV-ray setting adhesive and then secondarily fixed by a thermosetting resin, the optical coupling efficiency is improved and the reliability of the optical coupling is increased.

(4) Since the optical communication system of this embodiment is incorporated with an optoelectronic device having high optical coupling efficiency between the semiconductor laser chip and the optical fiber and capable of stable laser beam intensity monitoring by the photodetector, stable and highly reliable optical communication is possible.

The invention made by the present inventor has been explained specifically with reference to the preferred embodiments but this invention is not restricted only to the embodiments described above and can be modified and changed variously within a scope not departing the gist thereof. For instance, similar effects with those of the preferred embodiments can be also obtained by using grooves instead of the concaves 37 and 38.

The effects obtained by typical examples of the inventions disclosed in the present application are simply explained as below.

(1) It is possible to provide an optoelectronic device capable of stable optical power monitoring without hindering the transmission (passage) of a laser beam from a semiconductor laser chip to a photodetector.

(2) it is possible to provide an optoelectronic device capable of outputting stable optical power without hindering the transmission (passage) of a laser beam from the semiconductor laser chip to the optical fiber.

(3) In the optical communication system, since the incorporated optoelectronic device has high optical coupling efficiency between the semiconductor laser chip and the optical fiber and capable of stable laser beam intensity monitoring by the photodetector stable, highly reliable optical communication is possible.

It is further understood by those skilled in the art that the foregoing description is a preferred embodiment of the disclosed device and that various changes and modifications may be made in the invention without departing from the spirit and scope thereof.

What is claimed is:

1. An optoelectronic device comprising:
a platform,
a light emitting part fixed to a main surface of the platform and for emitting an optical beam from an end face,
light receiving parts fixed to the main surface of the platform and for receiving the optical beam emitted from the light emitting part, and
a guard layer made of a transparent resin disposed on the main surface of the platform and for covering the light emitting part, the light receiving parts and optical channels between the light emitting part and the light receiving parts, the optical channels being disposed on the main surface of the platform,
wherein concaves are present on the main surface of the platform between the light emitting part and the light receiving parts, and an edge of each of the concaves adjacent to the light emitting part is situated so that the end face of the light emitting part extends in a direction toward respective ones of the light receiving parts beyond the edge of the concaves which is adjacent to the light emitting part.

2. The optoelectronic device according to claim 1, wherein ends of bonding layers for fixing the light emitting part and the light receiving part to the platform recede inward of a light emitting facet of the light emitting part and a light receiving surface of the light receiving part, respectively.

3. The optoelectronic device according to claim 1, wherein the length of the edge of the concave extending in the direction perpendicular to the optical channel is smaller than the width of the light emitting part opposed thereto.

4. The optoelectronic device according to claim 1, wherein the platform is fixed in a casing made of a plastic material having a guide for guiding an optical fiber which is one of the light receiving parts, the guard layer is disposed in the casing so as to cover the platform, the light emitting part, the light receiving part and a top end of the optical fiber, and the casing is covered with a cap made of a plastic material fixed to the casing.

5. The optoelectronic device according to claim 1, wherein the guard layer is formed with a resin selected from the group consisting of silicone gel, silicone rubber, low stress epoxy resin, acrylic resin and urethane resin.

6. An optoelectronic device comprising:
a platform,
a light emitting part fixed to a main surface of the platform and for emitting an optical beam from an end face,
light receiving parts fixed to the main surface of the platform and for receiving the optical beam emitted from the light emitting part, and
a guard layer made of a transparent resin disposed on the main surface of the platform and for covering the light emitting part, the light receiving parts and optical channels between the light emitting part and the light receiving parts, the optical channels being disposed on the main surface of the platform,
wherein concaves are present on the main surface of the platform between the light emitting part and the light receiving parts and the end face of the light emitting part protrudes beyond an edge of the concave into the concave.

7. The optoelectronic device according to claim 6, wherein ends of bonding layers for fixing the light emitting part and the light receiving part to the platform recede inward of a light emitting facet of the light emitting part and a light receiving surface of the light receiving part, respectively.

8. the optoelectronic device according to claim 6, wherein the length of the edge of the concave extending in the direction perpendicular to the optical channel is smaller than the width of the light emitting part opposed thereto.

9. The optoelectronic device according to claim 6, wherein the platform is fixed in a casing made of a plastic material having a guide for guiding an optical fiber which is one of the light receiving parts, the guard layer is disposed in the casing so as to cover the platform, the light emitting part, the light receiving part and a top end of the optical fiber, and the casing is covered with a cap made of a plastic material fixed to the casing.

10. The optoelectronic device according to claim 6, wherein the guard layer is formed with a resin selected from the group consisting of silicone gel, silicone rubber, low stress epoxy resin, acrylic resin and urethane resin.

11. An optoelectronic device comprising:
a platform,
a light emitting part fixed on a main surface of the platform and for emitting optical beams from both end faces respectively,
an optical fiber fixed on the main surface of the platform and for receiving one of optical beams emitted from the light emitting part at a top end face,
a photodetector fixed to the main surface of the platform and for receiving another of the optical beams emitted from the light emitting part, and
a guard layer made of a transparent resin and for covering the light emitting part, the optical fiber, the photodetector and optical channels between the light emitting part and the optical fiber and between the light emitting part and the photodetector, the optical channels being disposed on the main surface of the platform,
wherein concaves are present on the main surface of the platform between the light emitting part and the optical fiber and between the light emitting part and the photodetector respectively, a first edge of the concave adjacent to the light emitting part between the light emitting part and the optical fiber is situated so that one of the end faces of the light emitting part extends toward the optical fiber beyond the first edge of the concave which is adjacent to the light emitting part and a second edge of the concave adjacent the light emitting part between the light emitting part and the photodetector is situated so that another of the end faces of the light emitting part extends toward the photodetector beyond the second edge of the concave which is adjacent to the light emitting part.

12. The optoelectronic device according to claim 11, wherein ends of bonding layers for fixing the light emitting part and the photodetector to the platform recede inward of a light emitting facet of the light emitting part and a light receiving facet of the photodetector, respectively.

13. The optoelectronic device according to claim 11, wherein, in the concave between the light emitting part and the photodetector, the length of the second edge of the concave extending in the direction perpendicular to the optical channel is smaller than the width of the light emitting part opposed thereto.

14. The optoelectronic device according to claim 11, wherein the platform is fixed in a casing made of a plastic material having a guide for guiding the optical fiber, a guard layer is disposed in the casing so as to cover the platform, the light emitting part, the photodetector and a top end of the optical fiber, and the casing is covered with a cap made of a plastic material fixed to the casing.

15. The optoelectronic device according to claim 11, wherein the guard layer is formed with a resin selected from the group consisting of silicone gel, silicone rubber, low stress epoxy resin, acrylic resin and urethane resin.

16. An optoelectronic device comprising:
a platform,
a light emitting part fixed on a main surface of the platform and for emitting optical beams from both end faces respectively,
an optical fiber fixed on the main surface of the platform and for receiving one of optical beams emitted from the light emitting part at a top end face,
a photodetector fixed to the main surface of the platform and for receiving another of the optical beams emitted from the light emitting part, and
a guard layer made of a transparent resin and for covering the light emitting part, the optical fiber, the photodetector and optical channels between the light emitting part and the optical fiber and between the light emitting part and the photodetector, the optical channels being disposed on the main surface of the platform,
wherein concaves are present on the main surface of the platform between the light emitting part and the optical fiber and between the light emitting part and the photodetector respectively, one of the end faces of the light emitting part protrudes beyond an edge of the concave between the light emitting part and the optical fiber into the concave, and another of the end faces of the light emitting part protrudes beyond an edge of the concave between the light emitting part and the photodetector into the concave.

17. The optoelectronic device according to claim 16, wherein a first end of a first bonding layer for fixing the light emitting part to the platform recedes inward of a light emitting facet of emitting the optical beam of the light emitting part, and a second end of a second bonding layer for fixing. the photodetector to the platform recedes inward of a light receiving facet of the photodetector.

18. The optoelectronic device according to claim 16, wherein, in the concave between the light emitting part and the photodetector, the length of the edge of the concave extending in the direction perpendicular to the optical channel is smaller than the width of the light emitting part opposed thereto.

19. The optoelectronic device according to claim 16, wherein the platform is fixed in a casing made of a plastic material having a guide for guiding the optical fiber, a guard layer is disposed in the casing so as to cover the platform, the light emitting part, the photodetector and a top end of the optical fiber, and the casing is covered with a cap made of a plastic material fixed to the casing.

20. the optoelectronic device according to claim 16, wherein the guard layer is formed with a resin selected from the group consisting of silicone gel, silicone rubber, low stress epoxy resin, acrylic resin and urethane resin.

* * * * *